(12) United States Patent
Trampler

(10) Patent No.: US 12,528,031 B2
(45) Date of Patent: Jan. 20, 2026

(54) DEVICE FOR PRODUCING A STANDARD ULTRASONIC FIELD

(71) Applicant: Felix Trampler, Hinterbrühl (AT)

(72) Inventor: Felix Trampler, Hinterbrühl (AT)

(*) Notice: Subject to any disclaimer, the term of this patent is extended or adjusted under 35 U.S.C. 154(b) by 799 days.

(21) Appl. No.: 17/611,866

(22) PCT Filed: May 13, 2020

(86) PCT No.: PCT/AT2020/060197
§ 371 (c)(1),
(2) Date: Nov. 16, 2021

(87) PCT Pub. No.: WO2020/227747
PCT Pub. Date: Nov. 19, 2020

(65) Prior Publication Data
US 2022/0241820 A1    Aug. 4, 2022

(30) Foreign Application Priority Data

May 16, 2019   (AT) .............................. A 50445/2019

(51) Int. Cl.
*B06B 1/20*       (2006.01)
*B01D 21/28*    (2006.01)

(52) U.S. Cl.
CPC .............. *B01D 21/283* (2013.01); *B06B 1/20* (2013.01)

(58) Field of Classification Search
None
See application file for complete search history.

(56) References Cited

U.S. PATENT DOCUMENTS 5,050,588 A * 9/1991 Grey ...................... G10K 11/30
                                                                                601/4
5,164,094 A    11/1992 Stuckart
(Continued)

FOREIGN PATENT DOCUMENTS

DE     102016002599 A1 *  9/2017    ........... B01D 21/283
EP         0633049 B1    11/1995
(Continued)

OTHER PUBLICATIONS

Böhm H. et al.: "Lateral Displacement amplitude distribution of water filled ultrasonic bio-separation resonators with laser-interferometry and thermochromatic foils", IEEE Conference Proceedings, 2001, pp. 726-728.
(Continued)

*Primary Examiner* — Bradley R Spies
*Assistant Examiner* — Jeannie Mcdermott
(74) *Attorney, Agent, or Firm* — Dykema Gossett PLLC

(57) ABSTRACT

Various embodiments of the present disclosure are directed to a device and a method for producing a standing ultrasonic field having the frequency f in a liquid. In one example embodiment, the device includes at least one oscillation element, a substantially dimensionally stable vessel having an outside wall and a substantially circular-cylindrical interior, the vessel receiving the liquid and the at least one oscillation element. The at least one oscillation element acoustically connected to the outside wall of the vessel and electrically excited at the frequency f. The substantially circular-cylindrical interior receives liquid with an inner radius $r_o$ at least in the region of the oscillation element. The oscillation element has a mean thickness p and a width b in the direction orthogonal to a main axis of the interior, and the width b is not greater than the inner diameter $2r_o$.

16 Claims, 13 Drawing Sheets

(56) References Cited

U.S. PATENT DOCUMENTS

| | | | | |
|---|---|---|---|---|
| 5,225,089 A | * | 7/1993 | Benes | B01D 43/00 |
| | | | | 366/127 |
| 5,533,402 A | * | 7/1996 | Sarvazyan | B06B 1/0655 |
| | | | | 73/645 |
| 5,658,534 A | * | 8/1997 | Desborough | B06B 3/00 |
| | | | | 422/127 |
| 2017/0298316 A1 | * | 10/2017 | Kennedy, III | C12M 23/14 |
| 2018/0088083 A1 | * | 3/2018 | Sinha | G01N 29/024 |
| 2018/0221848 A1 | * | 8/2018 | Iniesta Ortiz | B01J 19/2415 |

FOREIGN PATENT DOCUMENTS

| | | |
|---|---|---|
| EP | 1797941 A1 | 6/2007 |
| WO | 2002072236 A1 | 9/2002 |
| WO | 2017063080 A1 | 4/2017 |

OTHER PUBLICATIONS

Novotny H. et al.: "Layered piezoelectric resonators with an arbitrary number of electrodes", J.Acoust.Soc.Am., vol. 90, No. 3, Sep. 1991 (Sep. 1, 1991).

Trampler F.: "Ph.D. Thesis", Dec. 2000, Vienna University of Technology, article "Acoustic Accumulation of Acoustic Energy for industrial Processes" Chapter 7.

Withworth G et al.: "Particle Column Formation in a stationary ultrasonic field", J.Acoust.Soc.Am., vol. 91, 1992, pp. 79-85, XP000248399, DOI: 10.1121/1.402622.

* cited by examiner

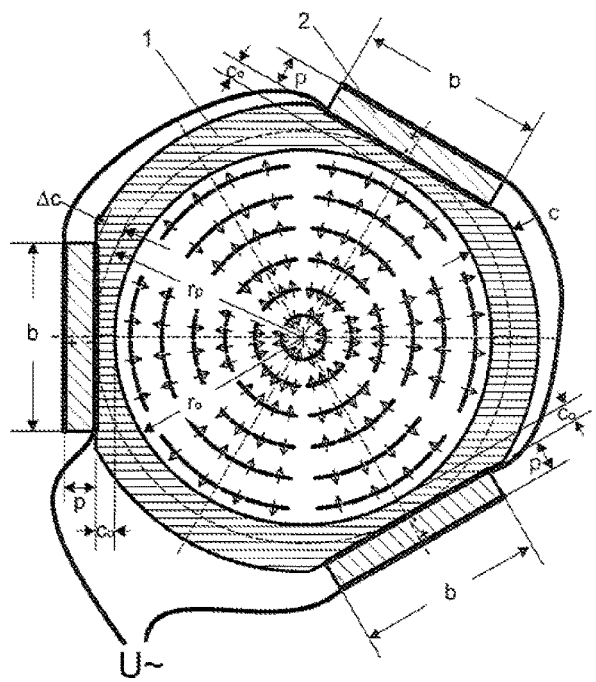
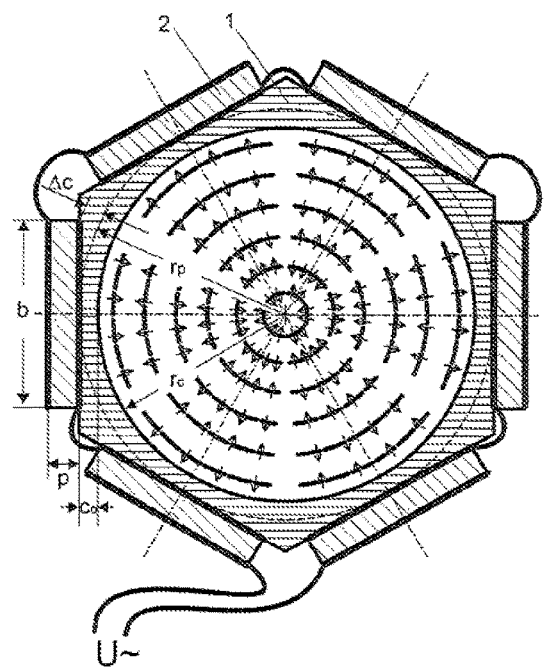
FIG.6A  FIG.6B
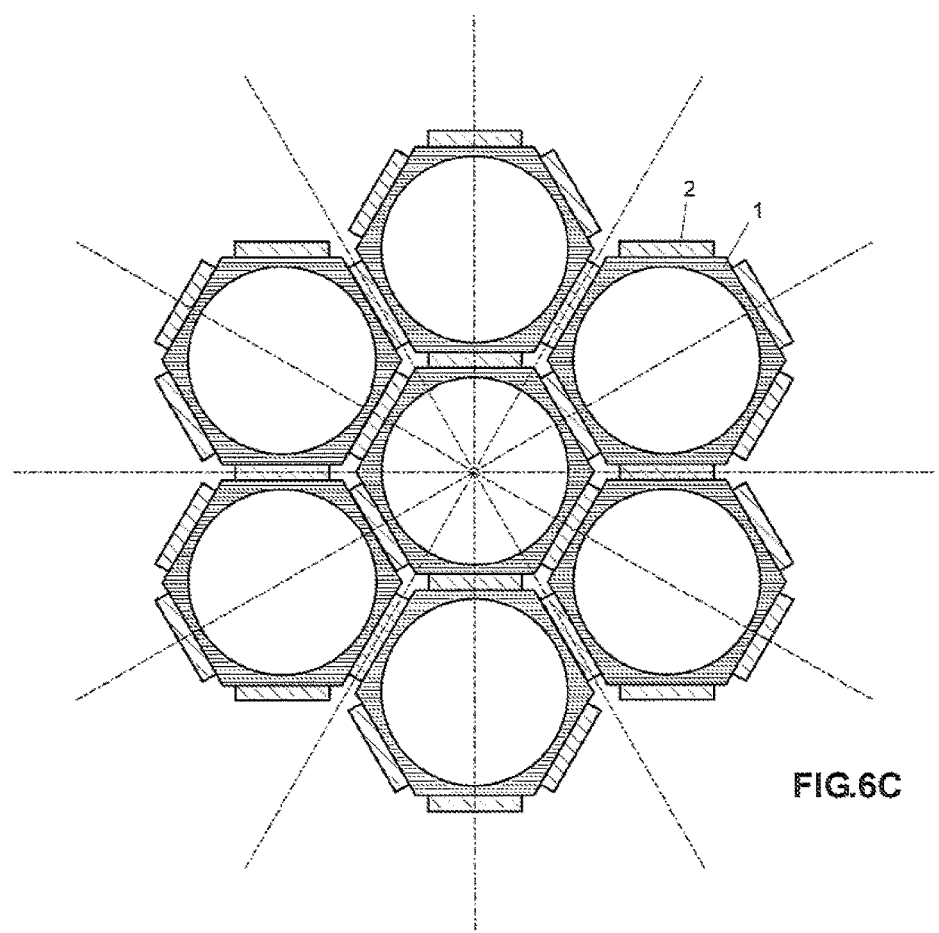
FIG.6C

BEST AVAILABLE IMAGE

DEVICE FOR PRODUCING A STANDARD ULTRASONIC FIELD

CROSS-REFERENCE TO RELATED APPLICATIONS

This application is a national stage filing based upon International application No. PCT/AT2020/060917, filed 13 May 2020, which claims the benefit of priority to Austria application No. A 50445/2019, filed 16 May 2019.

BACKGROUND

The invention relates to a device for producing a standing ultrasonic field having the frequency f in a liquid, in particular for concentrating, immobilizing or manipulating dispersed particles in the liquid or for retaining or separating dispersing particles from the liquid, comprising a substantially dimensionally stable vessel for receiving the liquid and at least one oscillation element acoustically connected to an outside wall of the vessel, wherein the vessel comprises, at least in the region of the oscillation element, an essentially circular-cylindrical interior for receiving the liquid with an inner radius $r_o$, and wherein the oscillation element has a mean thickness p and a width b in the orthogonal direction to a main axis of the interior, wherein the width b is not greater than the inner diameter $2r_o$.

It also relates to a method for producing a standing ultrasonic field with frequency f in a liquid, in particular for concentrating dispersed particles in the liquid or for separating dispersing particles from the liquid by applying a standing ultrasonic field in a substantially dimensionally stable vessel, wherein at least one oscillation element is excited at at least one frequency f and the oscillation element oscillates the vessel and the liquid arranged in a circular-cylindrical interior, wherein the oscillation element has a mean thickness p and the interior has an inner radius $r_o$, and wherein the oscillation element has a width b in the direction orthogonally to a main axis of the interior, wherein the width b is not greater than the inner diameter $2r_o$.

When a liquid is exposed to an ultrasonic field, for example by introducing oscillations from the oscillation element through the vessel into the liquid, various effects can be achieved in the liquid, such as its mixing or its heating. Using standing ultrasonic fields, acoustic technologies are used in particular for the separation or manipulation of cells, bacteria and microorganisms, fine solids, droplets, bubbles and the like, (i.e. generally particles in solid, liquid and gaseous state—hereinafter referred to as particles for simplicity) in or from the liquid (also referred to as medium). These particles can be dispersed, suspended or emulsified in the liquid and typically have a size in the range between one wavelength and one thousandth of a wavelength of the applied standing ultrasonic field. In this case, the liquid is arranged in the interior of the vessel and the acoustic system is made to oscillate by the oscillation element. The acoustic system means the part which is made to oscillate and thus comprises at least the vessel, the oscillation element and the liquid in the interior. A standing wave field is built up in the interior by reflection at the vessel wall or also by superposition of ultrasonic waves of the same frequency from opposite directions, whereby the particles collect and preferably aggregate in the oscillation bulges or nodes of the standing wave field. In this process, the liquid can also be carried through the interior continuously while the collected particles are prevented from passing through by the standing wave. Thus, even a large amount of fluid can be cleaned of these particles.

Such devices or methods are used, for example, in biotechnology or laboratory diagnostics for the separation of cells, bacteria, and other microorganisms from a nutrient medium, or also for the concentration of trace elements and pollutants (such as suspended heavy metal particles, or emulsified hydrocarbon droplets) for their improved detectability, or also for the recovery of valuable particulate materials (for example rare earths or precious metals). For the enrichment or separation of substances and particles which are too small to be detected directly by the ultrasonic field (e.g. viruses or molecules), so-called carrier particles can also be used, the surface of which is occupied by the substances sought, in order to then be separated together with the carrier particle by the ultrasonic field. The surface of such a carrier particle can also be selectively activated biotechnologically, mechanically, magnetically, electrically or chemically in order to separate only certain desired substances from the medium with the aid of the carrier particle. This technology can also be used to purify the liquid.

Acoustic separation technology is based on the mechanism of acoustic sound radiation force, known from the literature for decades, which is exerted by a standing acoustic field on particles dispersed in a liquid and concentrates them, depending on the acoustic contrast of the particles with respect to the liquid (the medium), either into the sonic bulges of the standing wave field (valid for most solid particles and dispersed droplets relevant to the application, which are heavier than the liquid), or concentrated into the sonic nodes (valid for air bubbles or droplets which are lighter than the liquid). In this case, the frequency of the wave field is typically chosen so that the wavelength of the acoustic field in the medium is one to two orders of magnitude larger than the diameter of the particles to be separated. Of practical relevance is a frequency range especially in the order of 100 kHz to 10 MHz.

Due to the acoustically induced migration of the particles into the sonic bulge or sonic node areas of the standing field, the particles are typically compressed there into particle aggregates, which in the case of liquid or gaseous particles can also lead to fusion into larger drops or bubbles. The distance between two adjacent areas where such compression occurs (i.e. between adjacent sonic bulges, or adjacent sonic nodes) is half the wavelength of the ultrasonic field in the medium.

For the stable formation of a standing wave field, the vessel must be essentially dimensionally stable in order to be able to reflect the acoustic wave in a constant direction and distance from the sound source. In particular, therefore, the dimensional stability of the vessel wall in the region of sound generation, and of the vessel wall opposite the sound generation, is of importance. Dimensionally unstable vessels such as plastic bags or the like are therefore unsuitable unless they are in turn appropriately supported by dimensionally stable devices. Vessels made of metal, glass or hard plastic have proven to be particularly stable and easy to manufacture, and especially made of materials that are also biocompatible and thus particularly suitable for biotechnological and medical applications.

Since, however, practically every acoustic standing sound field is not built up ideally homogeneously, but the acoustic energy of the standing wave field is typically distributed inhomogeneously within this vessel (for example, due to the typically inhomogeneous radiation from the surface of the sound-emitting oscillation element[1], as well as due to coupling acoustic resonance fields which can also build up in the transverse direction to the sound propagation, for example, due to acoustic reflection between the lateral inner walls of the vessel), acoustic forces occur at the particle aggregates not only in the direction of the sound wave emitted by the oscillation element, but also acoustic forces acting in such transverse directions, which can counteract the entrainment of the particle aggregates with a possible movement of the liquid flowing through the acoustic area in a likewise transverse direction. In the literature, this is classically referred to as "acoustic trapping" or the macroscopic formation of particle bands or "particle columns"[2]. If the original particle concentration of the liquid is low, only relatively few particles are enriched in a sonic bulge or node, and the effect of acoustic trapping can be observed in a particularly pronounced manner.

[1] Böhm H. et al: Lateral Displacement amplitude distribution of water filled ultrasonic bio-separation resonators with laser-interferometry and thermochromatic foils. IEEE Conference Proceedings (2001), page 726-728.
[2] e.g. Withworth G et al: *Particle Column Formation in a stationary ultrasonic field*. J. Acoust. Soc. Am. 91 (1992), page 79-85

Due to the local concentration of particles within the sonic bulges (or nodes) and their associated compaction, if further particles are continuously introduced (e.g. when dispersion flows through the wave field), the particle aggregates trapped in this way can continue to grow over time and become too heavy to be held permanently by the acoustic forces in opposition to buoyancy or gravitational forces. If the particle aggregates become too large, this results in spontaneous precipitation of the particle aggregates by sedimentation (for particles heavier than the liquid) or flotation (for particles lighter than the liquid). However, such precipitation can also be brought about in a controlled manner (by deliberately deactivating the sound field).

The higher the initial particle concentration in the medium before entering the standing wave field, the more difficult it becomes to maintain permanent acoustic trapping, since the formed particle aggregates very quickly become too heavy (or too light) to be held by acoustic forces against buoyancy or gravity. At a particle concentration within the fluid (entering the acoustic field) of the order of >1% (v/v), typically no stable phase of random (i.e. not by stabilizing specifically generated acoustic wave geometries with strong transverse field gradients) acoustic trapping is observable; the compaction of particles into aggregates and the subsequent precipitation of the aggregates from the wave field is essentially perceived as an interflowing process.

This interflowing process of particle compaction to aggregates and precipitation of the aggregates by gravity or buoyancy is also described in the literature as "Acoustically Enhanced Sedimentation" or analogously "Acoustically Enhanced Floatation"[3].

[3] Trampler F., *Acoustic Accumulation of Acoustic Energy for industrial Processes*. Ph.D. Thesis, Vienna University of Technology, (December 2000), chapter 7.

For such acoustically induced separation processes, especially for liquids with particle concentrations >1% (v/v), lateral acoustic forces are only of limited help, since due to the relatively high particle concentration, sufficient compaction can already take place within the sonic bulge or sonic node planes (forming normal to the sound propagation direction), and additional transverse forces (i.e. parallel to these sonic bulge/node planes) do not lead to further compaction of the already very large forming particle aggregates, but on the contrary to a splitting of a large one into several smaller ones, whereby an effective continuous precipitation of the aggregates from the wave field is hindered.

In practice, it has been shown that for the separation of dispersions with particle concentrations >1% (v/v) based on the principle of acoustically induced precipitation described above, the transverse acoustic forces should typically be kept an order of magnitude weaker than the longitudinal acoustic forces (which cause the primary migration of particles into the sonic bulges or node planes).

An effective method to maximize longitudinal sound forces (i.e. sound forces acting in the direction of sound propagation) over transverse sound forces is the targeted excitation of a flat standing wave field as described in patent EP 0,633,049 B1. Following this embodiment, a dominant expression of flat sonic bulge and sonic node regions parallel to the flat emitting surface of the vessel and, if applicable, of the parallel opposite flat reflector can be achieved. This strictly parallel positioning of acoustically emitting and reflecting surfaces allows the position of the sound-bulge and sound-node planes to be defined essentially by the longitudinal dimension x normal to them alone. Detailed mathematical principles for such a one-dimensional description of a standing acoustic field can be found in the literature.[4]

[4] e.g: Novotny H, et al: Layered piezoelectric resonators with an arbitrary number of electrodes. J. Acoust. Soc. Am. 90(3), September 1991

Commercial application of flat standing acoustic wave fields is found with the acoustic "Biosep" cell retention systems for the perfusion of bioreactors marketed by "Applikon Biotechnology By" since about 1995.[5] In some of the embodiments of this Biosep product family, the accidental generation of any transverse wave field (and thus the generation of acoustic forces acting transversely on the particle aggregates) is further minimized by coating the lateral walls of the acoustically active region with acoustically absorbing silicone.

[5] Applikon Dependable Instruments BV: *Biosep—the advanced cell retention device*. Technical Data Sheet STS90

However, despite these measures to optimize a flat standing wave field, fundamental disadvantages remain which are associated with the associated parallel—typically rectangular—geometry of the interior of such a separator in the prior art:

The rectangular cross-section of the acoustically active interior area makes cleaning more difficult and there is a risk of permanent deposits in the corner areas.

Substantial manufacturing costs of the exactly parallel interior surfaces of the acoustically active rectangular area.

The transitions of the typically tubular inflow and outflow to the rectangular cross-section of the intermediate acoustic area further complicate the internal geometry and sealing.

Especially for the application in disposable systems (as typical for medical and biotechnological processes), rectangular internal geometries therefore pose a considerable problem.

An alternative embodiment of an acoustic separator is proposed in U.S. Pat. No. 5,164,094 in circular-cylindrical geometry. Here, the sound-emitting oscillation element is designed as a hollow cylindrical piezoceramic, whereby the acoustic standing wave field is formed as a coaxial circular-cylindrical pattern in a suspension tubularly enclosed by the piezoceramic (and/or in a suspension tubularly enclosing the piezoceramic). Such a circular-cylindrical generated field geometry can be trivially described in cylindrical coordinates, since sonic bulges and nodes are essentially formed as coaxial circular-cylindrical shell surfaces arranged around the circular-cylindrical axis, whose position is determined only by the radial dimension r (i.e. the normal distance to the cylinder axis). A striking advantage over flat standing field geometries is that there are no reflecting side walls in the transverse direction (in cylinder coordinates this is the tangential direction) through which a transverse standing wave field could build up, since the circular-cylindrical bulge/node regions are closed in on themselves (in the tangential direction).

However, the required piezoelectric elements in the form of circular-cylindrical tubes are technically complex and expensive to manufacture. Also, for medical or biotechnological applications, for example, direct contact of the suspension with the piezoceramic must be avoided, i.e. the circular-cylindrical ceramic must de facto be pushed onto a biocompatible carrier tube in an acoustically coupling manner, and/or inserted into such a carrier tube. Also with regard to the requirements for mechanical robustness in industrial applications, in many cases it is necessary to push the piezoceramic cylinder over or into a carrier tube. The production of such a carrier tube, for example from glass or steel, or even biocompatible plastics (the latter, however, is only possible in a thin-walled version due to the increased acoustic absorption of many plastics), as well as the acoustically precisely coupled bonding, is very complex and error-prone due to the necessary coaxial precision to the inner or outer diameter of the piezo tube.

A further known embodiment comprises a cylindrical vessel, on the shell of which on the outside wall one or more curved piezo elements are arranged as oscillation elements and rest against this curved wall and are firmly connected to it. Preferably, two piezo elements are always arranged opposite each other. By appropriate anti-synchronous excitation, for example of two mutually orthogonal piezo pairs, the increase in acoustic pressure amplitude in the region of the central axis caused by the focusing effect of the cylindrical geometry can be somewhat reduced. However, very high pressure amplitudes still occur in the area of the central axis, which can lead to a change or destruction of the particles. Especially in the case of living cells, this can lead to a deterioration of the viability or to the death of the cells.

Thus, it is the object of the invention to provide a device and a method of the types mentioned having a reduced risk of high pressure amplitudes.

SUMMARY OF THE INVENTION

According to the invention, this object is solved in that the oscillation element has at least one substantially flat lateral surface, and in that the oscillation element is acoustically connected via this one flat lateral surface to a substantially flat connection surface of the outside wall of the vessel in the region of the circular-cylindrical interior, wherein the connection surface is arranged parallel both to the main axis of the circular-cylindrical interior and to the oscillation element.

It is also solved in that the oscillation element transmits the oscillations to the vessel via a substantially flat side wall of the oscillation element via a substantially flat connection surface of the outside wall of the vessel in the region of the circular-cylindrical interior, and in that the connection surface is arranged parallel both to the main axis of the circular-cylindrical interior and to the oscillation element.

The present invention presents a device which combines the acoustic and fluidic advantages of a circular-cylindrical interior and the coaxial standing wave pattern caused thereby with the manufacturing advantages by using flat sound-emitting components as oscillation elements, such as flat piezoceramic plates.

Surprisingly, if the oscillation element is connected to the vessel via a flat surface, the occurrence of high pressure amplitudes in the interior, in particular in the center of the interior, can be reduced or even avoided. This reduces the risk of damage or destruction of the particles to be aggregated, which is a particular advantage in the case of cells or microorganisms. In this regard, the oscillation element is designed to be equally flat at least in the region where it is connected to the vessel. On the side facing away from the connection surface, the oscillation element can be of curved design or can be equally flat, wherein in flat embodiments of the side facing away, the two sides of the oscillation element are preferably aligned parallel to one another. The flat feed slightly disturbs or distorts the perfectly round shape of the generated wave field, which effectively prevents the occurrence of excessive pressure amplitudes in the fluid in the region of the center of the vessel. Moreover, such an embodiment greatly facilitates and cheapens the manufacturing process, since curved oscillation elements are very difficult to manufacture, especially if they are to be connected to an equally curved outside wall. On the other hand, flat, straight oscillation elements are easier and cheaper to manufacture. Preferably, the flat connection surface can be arranged on the vessel by removing a part of the vessel wall, for example by milling or planing. Alternatively, the connection surface may already be provided during the manufacture of the vessel, for example during the injection or casting of the vessel. Furthermore, the outer surface of the vessel, which is cylindrical in itself, can also be partially extended by additional elements in order to create a flat connection surface.

Preferably, it is provided that the oscillation element has at least one piezoelectric plate polarized in the thickness direction and aligned parallel to the main axis of the circular-cylindrical interior, and the piezoelectric plate has electrode surfaces normal to the thickness direction. Accordingly, it is also advantageous if at least one piezoelectric plate of the oscillation element polarized in the thickness direction and aligned parallel to the main axis of the circular-cylindrical interior oscillates the oscillation element in the thickness direction p thereof, wherein the piezoelectric plate has electrode surfaces disposed normal to the thickness direction. The piezoelectric plate can be used for the purpose of electrically exciting acoustic oscillations in the direction of the thickness p, i.e. in the thickness direction. Thus, a simple, inexpensive and electrically easily excitable embodiment for the oscillation element is found, which can be made to oscillate by applying an AC voltage with frequency f. One or also a plurality of piezoelectric plates may be provided, which in the latter case may be arranged in the oscillation element side by side or one behind the other as viewed from the vessel, i.e., in the width direction along the width b or in the thickness direction along the thickness p. In this case, the oscillation element may essentially comprise only one plate or a plurality of plates. Side by side means that the edges of the piezoelectric plates face each other, in other words that the piezoelectric plates are adjacent to each other with respect to the connection surface of the vessel. Thus, each piezoelectric plate is associated with different regions of the connection surface, wherein the electrode surfaces of the piezoelectric plates are preferably arranged at the same height. Behind one another means that the electrode surfaces of the piezoelectric plates at least partially project beyond each other and are preferably arranged congruently. Thus, two piezoelectric plates arranged one behind the other are essentially associated with the same region of the connection surface of the vessel. In this context, the described areas of the connection surface may also constitute the entire connection surface.

Typically, the oscillation element is configured as at least one flat piezoelectric plate, or comprises at least one flat piezoelectric plate on one side. The flat side wall of the oscillation element, which is acoustically connected to the connection surface of the outside wall of the vessel, may thereby be such a flat side wall of one or more piezoelectric plates.

Further, it is advantageous if the oscillation element has a substantially uniform thickness corresponding to the mean thickness p of the oscillation element. Accordingly, it is also advantageous if the oscillation element is selected to have a substantially uniform thickness corresponding to the mean thickness p of the oscillation element. In this case, uniform means that the thickness remains substantially the same along the length and width of the oscillation element.

Thus, if the oscillation element is also flat on the side facing away from the vessel, and this side is parallel to the side facing the vessel, the result is a substantially uniform thickness, this being equal to the mean thickness p.

In embodiments where the thickness varies along the width b or length, for example in curved oscillation elements, the mean thickness p is the thickness arithmetically averaged along the width.

It is advantageous if the device has a transducer array which comprises at least the oscillation element and a vessel wall section in the region of the oscillation element, and also, optionally, further parts which are arranged in the thickness direction of the oscillation element and are acoustically coupled to the oscillation element and/or the vessel wall section. In this regard, a device may comprise a plurality of transducer arrays which may be connected in series and/or in parallel. The wall parts of the vessel, which are arranged in the region of the oscillation element, resonate in the direction of sound propagation and are thus part of the transducer array. The parts of the vessel which are further away from the oscillation element, on the other hand, are not part of the transducer array, since these areas are insignificant for the transmission of the oscillations from the oscillation element into the interior of the vessel.

The acoustic system comprises the transducer array/assemblies and, optionally, opposing reflecting layers, in particular the opposing vessel wall as well as all interposed acoustically coupled solid or liquid regions, including in particular the liquid loaded with the particles in the interior of the vessel, but also any additional partitions (for example belonging to a sample container immersed in the interior of the vessel) and other acoustically coupled liquid layers (for example serving thermostatic purposes).

The longitudinal direction is understood to be the direction of sound propagation; thus defined as the direction normal to that acoustically emitting surface of the transducer array which is in direct contact with the medium to be sonicated.

Transverse directions are all directions normal to the longitudinal direction of sound propagation, thus they are oriented parallel to the acoustically emitting surface of the transducer array.

Sonic bulges are the stationary regions of a standing acoustic wave field where the acoustic amplitude of deflection reaches a local maximum with respect to the longitudinal direction. In the longitudinal direction, adjacent sonic bulges are spaced apart by half a wavelength of the sound wave in the liquid, and are parallel to each other (as well as to the emitting surface of the transducer array).

Sonic nodes are the stationary regions of a standing acoustic wave field where the acoustic deflection amplitude is zero with respect to the longitudinal direction. As a consequence, the pressure amplitude of the standing wave field reaches a local maximum in a sonic node region. Sonic nodes adjacent to each other in the longitudinal direction are at a distance of half a wavelength of the sound wave in the liquid, and are parallel to each other (as well as to the emitting surface of the transducer array).

In some of the known devices according to the prior art, the dispersion is arranged between a flat acoustically emitting surface of one transducer array and a second flat acoustically emitting surface of a second transducer array that is mirror-image and parallel opposite, wherein it is provided that the two transducer arrays that are mirror-image opposite to each other are excited with the same frequency and amplitude. Thus, a flat acoustic standing wave field is generated. Alternatively, instead of the second transducer array, a flat reflective surface may be positioned parallel opposite the first transducer array. The flat standing wave field is generated in the interposed fluid by superposition of the two emitted waves (or emitted and reflected waves, as the case may be). Viewed in the Cartesian coordinate system, the propagation of an emitted (and optionally reflected) flat sound wave is essentially along one dimension, here chosen to be x. Accordingly, the emitting surfaces of the transducer(s), and optionally an opposite reflecting surface, as well as all sonic node and sonic bulge planes of the generated flat standing wave field are normal to x and thus parallel to the directions y and z. Consequently, the position of the sonic nodes and sonic bulges can be assumed to be defined by the Cartesian dimension x.

In contrast thereto, the present invention relates to a non-flat acoustic standing wave field, and more specifically to a cylindrical acoustic standing wave field. This is generated by an acoustic system having a circular-cylindrical shaped acoustic emitting surface of the transducer array, (and analogous to the flat case, optionally by a reflecting circular-cylindrical surface positioned axially symmetrically thereto). The standing cylindrical wave field is generated in the interposed fluid around the cylinder axis by superposition of the axially symmetrically emitted waves (or, optionally, of emitted and reflected waves). Viewed in the cylindrical coordinate system, the propagation of the emitted (and, optionally, reflected) circular-cylindrical sound wave occurs essentially along the radial dimension r., which in turn allows a one-dimensional description of the generated standing wave field (now in the cylindrical direction r instead of the Cartesian direction x). Accordingly, the emitting circular-cylindrical surface of the transducer array, (and, optionally, the opposite reflecting surface, as well as all the sonic node and sonic bulge surfaces are substantially normal to r and thus parallel to the direction of the main axis H (or also called the cylindrical axis or central axis) lying in the direction z and the tangential dimension φ. As a result, the position of the sonic nodes and sonic bulges is essentially defined by the radial dimension r. A modulation of sonic node and sonic bulge shell surfaces by possible couplings with standing wave fields formed in transverse directions z and φ is of less relevance and can be neglected for this one-dimensional description of the positioning of the sonic bulge and sonic node shell surfaces.

The oscillation element is acoustically connected to the vessel in such a way that its oscillations are at least partially transmitted to the vessel, preferably it is glued to the vessel.

However, it can also be fused directly with the vessel or, for example, be attached to the vessel wall only temporarily with an acoustically coupled gel or a liquid.

If several oscillation elements are provided, which are connected to a vessel, it can be provided that two oscillation elements are opposite each other in the cross-section, wherein these are preferably excited with the same frequency and preferably without phase shift. More than two oscillation elements may also be distributed over the cross-section, preferably rotationally symmetrically.

It is preferably provided that the oscillating member stands parallel to the cylinder axis and substantially normal and symmetrical to an inner radius $r_o$ of the interior. The interior is substantially circular in cross-section at least at one level, thereby providing a center point, and is rotationally cylindrical in shape, thereby providing a main axis on which the center point lies. In this case, the inner radius means half the diameter of the interior in cross-section normal to the oscillation element. The radius of the interior extends from the center of the interior to the inner wall of the vessel. The feed of the oscillations into the circular cross-section is thus aligned parallel to the main axis.

In a preferred embodiment, it is provided that the outside wall of the vessel in the region of the circular-cylindrical interior has a substantially circular-cylindrical shape apart from the at least one connection surface to the oscillation element. In this case, the oscillation element is connected to the connection surface in an oscillating manner and can thus transmit the oscillations to the vessel. Thus, the vessel has the shape of a hollow cylinder. This is easy and inexpensive to manufacture, while nevertheless allowing predetermined size dimensions to be accurately maintained. The flat connection surface is preferably milled or otherwise removed from a previously manufactured round vessel. In this case, the connection surface may project beyond the oscillation element laterally or along the main axis, or the oscillation element may project beyond the connection surface.

Preferably, the oscillation element is configured as a piezo plate polarized in its thickness direction and having electrode surfaces substantially normal to the thickness direction, whereby it begins to oscillate when an AC voltage is applied to said electrode surfaces.

In order to optimize the acoustic characteristic of the oscillation element, which is designed as a piezoelectric plate, as a sound emitter emitting substantially in the direction of its thickness, it is advantageous if it has a length in the direction parallel to the main axis of the interior which is at least twice as large, preferably at least three times as large, as the thickness p, and has a width b in the direction orthogonal to the main axis of the interior which is at least twice as large, preferably at least three times as large, as the thickness p. Accordingly, it is also advantageous if the size of the oscillation element is chosen such that it has, in the direction parallel to the main axis of the interior, a length which is at least twice as large, preferably at least three times as large, as the thickness p, and that the width b of the oscillation element is at least twice as large, preferably at least three times as large, as the thickness p.

The inner diameter $2r_o$ of the vessel is at least as large as the width b of the oscillation element. This minimum size of the inner diameter makes it possible that as large a proportion as possible of the total acoustic energy is allotted to the wave field inside the vessel.

It is particularly advantageous if the width b of the oscillation element is less than or equal to $3 \cdot (r_P \cdot v_C/f)^{1/2}$, preferably between $(r_P \cdot v_C/f)^{1/2}$ and $2.5 \cdot (r_P \cdot v_C/f)^{1/2}$, and particularly preferably between $1.5 \cdot (r_P \cdot v_C/f)^{1/2}$ und $2 \cdot (r_P \cdot v_C/f)^{1/2}$, wherein $r_P = r_o + c_o$ applies, $r_o$ is the inner radius of the interior, $c_o$ is the minimum wall thickness of the vessel wall section in the region of the oscillation element, and $v_C$ is the sound velocity in the vessel wall section. In the case of embodiments with vessels of larger radii, it can also be advantageous if the width b of the oscillation element lies in a range between $(r_P \cdot v_C/f)^{1/2}$ und $3 \cdot (r_P \cdot v_C/f)^{1/2}$ and is particularly preferably about $2 \cdot (r_P \cdot v_C/f)^{1/2}$.

Width b further means the width of the oscillation element which is substantially orthogonal to the main axis of the circular-cylindrical interior of the vessel.

If the sound velocity of the vessel wall differs at different points, $v_C$ means the sound velocity in the area of the vessel wall located between the oscillation element and the interior.

By selecting such a width of the oscillation element, the oscillation element is sufficiently wide that the device can be well excited, but at the same time the oscillation element is still sufficiently narrow to limit the different acoustic path lengths of the oscillations between the oscillation element and the main axis, which are caused by the flat surface of the oscillation element (i.e. not coaxial to the interior of the vessel), to a sufficient extent, and thus a sufficiently strongly radially pronounced vibration pattern of the standing wave field can still be generated.

These embodiments also apply when the frequency f is chosen so that the width b of the oscillation element is less than or equal to $3 \cdot (r_P \cdot v_C/f)^{1/2}$, preferably lies between $(r_P \cdot v_C/f)^{1/2}$ und $2.5 \cdot (r_P \cdot v_C/f)^{1/2}$, and particularly preferably lies between $1.5 \cdot (r_P \cdot v_C/f)^{1/2}$ und $2 \cdot (r_P \cdot v_C/f)^{1/2}$, respectively in particular for larger radii if the frequency f is selected in such a way that the width b of the oscillation element lies in the range between $(r_P \cdot v_C/f)^{1/2}$ und $3 \cdot (r_P \cdot v_C/f)^{1/2}$, and is particularly preferably about $2 \cdot (r_P \cdot v_C/f)^{1/2}$, wherein $r_P = r_o + c_o$ applies, $r_o$ is an inner radius of the interior, $c_o$ is the minimum wall thickness of a vessel wall section in the region of the oscillation element, $v_C$ is the sound velocity in the vessel wall section. In this case, the width b can also be selected at the time of construction so that this is fulfilled when the oscillation element is excited at a predetermined frequency f.

As already stated at an earlier point, it is advantageous if the device has a transducer array which comprises at least the oscillation element and a vessel wall section in the region of the oscillation element, and possibly also further parts arranged in the thickness direction of the oscillation element and acoustically coupled to the oscillation element and/or the vessel wall section. In this case, the vessel wall section has a minimum wall thickness $c_o$ in the region of the oscillation element in the region of the center of the connection surface, and a maximum radial wall thickness $c_{max} = c_o + \Delta c$ in the edge region of the oscillation element, wherein an equivalent average wall thickness $c_{equ}$ of the vessel wall section is defined by $c_{equ} = c_o + \Delta c/3$, and the difference $\Delta c$ between the maximum radial wall thickness $c_{max}$ and the minimum wall thickness $c_o$ is determined by the width b of the oscillation element via the relationship $\Delta c = (b^2/4 + r_P^2)^{1/2} - r_P$, wherein $r = r_o + c_o$ applies, and $r_o$ is the radius of the circular-cylindrical interior.

Apart from the actual oscillation element, the transducer array thus also comprises that fixed part or those fixed parts of the device which are acoustically coupled to the oscillation element in the propagation direction of the emitted wave. The transducer array thus comprises the actual sound-emitting element, i.e. the oscillation element (i.e. preferably a piezoelectric plate excited by an alternating electrical signal), and all solid layers acoustically coupled thereto in the thickness direction (e.g. by bonding), e.g. in particular the vessel in the region of the connection surface with the oscillation element, and possibly further acoustically coupled inner or outer transformation, insulation and/or protective layers. A transducer array is thus generally limited inwardly by the dispersion layer to be sonicated, and outwardly by the ambient air, or, depending on the embodiment, by another gaseous, sound-decoupled solid or liquid environment (for example for the purpose of cooling the transducer array).

In this context, it is advantageous if the thicknesses of the layers of the transducer array are selected in such a way that natural resonance frequencies $f_{er}$ of the transducer array to the desired frequency f of the ultrasonic field have distances which are greater than one fifth of the distance $f_{er,1}-f_{er,2}$, wherein $f_{er,1}$ and $f_{er,2}$ are the two nearest natural resonance frequencies $f_{er}$ with respect to the frequency f. In this way it can be prevented that injected acoustic energy remains to a considerable extent in the transducer array, i.e. in the vessel wall, the oscillation element or elements and possibly in components further acoustically coupled to these parts, instead of being emitted into the liquid in the interior of the vessel and contributing there to the build-up of an effective acoustic standing wave field.

In this sense, it is also advantageous if the frequency f is chosen to be outside the natural resonance frequencies $f_{er}$ of a transducer array, and that the distance of the chosen frequency f to the natural resonance frequencies $f_{er}$ have distances which are greater than one fifth of the distance $f_{er,1}-f_{er,2}$, wherein $f_{er,1}$ and $f_{er,2}$ are the two closest natural resonance frequencies $f_{er}$ with respect to the frequency f.

The natural resonance frequencies of a transducer array are the resonance frequencies of the transducer array in the absence of medium (i.e., in the absence of fluid in the interior of the vessel). In the absence of medium, no acoustic energy can be emitted from the transducer array into the medium, which means that the acoustic system remains limited to the transducer array alone, and thus natural resonance frequencies are determined solely by geometric and acoustic parameters of the transducer array.

As with all resonance frequencies of an acoustic system in general, the natural resonance frequencies of a transducer array are characterized by the fact that at this frequency the active power consumption by the transducer array is at a maximum for an impressed excitation signal applied to the oscillation element (i.e., at a certain voltage or current amplitude of the excitation signal, or at some other electrical output characteristic defined by the output impedance of the electrical signal amplifier).

In essence, natural resonance of a transducer array occurs when the half-wave number over the total thickness of a transducer array is equal to an integer, wherein the total thickness is formed from the thicknesses p of the oscillation element, and the equivalent thickness $c_{equ}=c_o+\Delta c/3$ of the vessel wall section in the region of the oscillation element, and possibly the thicknesses of the further layers of the transducer array (if present).

Thicknesses of the layers of the transducer array mean the thicknesses of those layers of which the transducer array consists. In the simplest case, this means the thicknesses of the oscillation element and the wall section in the area of the oscillation element, i.e. p and $c_{equ}$. If further layers are part of the transducer array, the thicknesses of these layers are also meant.

In order to avoid the excitation of natural resonances of a transducer array, which may have any number of layers belonging to the transducer array, during the operation of a device, it is particularly advantageous if the thicknesses of the layers of the transducer array acoustically coupled in the thickness direction of the oscillation element are selected such that the half-wave number κ of the transducer array satisfies the condition $$\kappa = \frac{1}{2} + n \pm \Delta n$$

wherein n is a natural number, and the tolerance value $\Delta n$ is at least less than 0.3, preferably less than 0.2, and particularly preferably less than 0.1, and the half-wave number κ of the transducer array is substantially given by $$\kappa = 2f \cdot (c_{equ}/v_c + p/v_P + d_1/v_{d1} + d_2/v_{d2} + \ldots + d_i/v_{di})$$

wherein $v_c$ is the sound velocity in the vessel wall section in the region of the oscillation element, $v_p$ is the sound velocity in the thickness direction in the oscillation element, and $d_1$ to $d_i$ are the thicknesses and $v_{d1}$ to $v_{di}$ are the sound velocities of further layers of the transducer array acoustically coupled in the thickness direction, insofar as these are present, and the index number "i" is a natural number indicating the number of these further layers of the transducer array.

Accordingly, it is also advantageous if the frequency f is selected so that the half-wave number κ of the transducer array satisfies the condition $$\kappa = \frac{1}{2} + n \pm \Delta n$$

wherein n is a natural number and the tolerance value $\Delta n$ is at least less than 0.3, preferably less than 0.2, and particularly preferably less than 0.1, and the half-wave number κ of the transducer array is substantially given by $$\kappa = 2f \cdot (c_{equ}/v_c + p/v_P + d_1/v_{d1} + d_2/v_{d2} + \ldots + d_i/v_{di})$$

wherein $v_c$ is the sound velocity in the vessel wall section in the region of the oscillation element, $v_p$ is the sound velocity in the thickness direction in the oscillation element, and $d_1$ to $d_i$ are the thicknesses and $v_{d1}$ to $v_{di}$ are the sound velocities of further layers of the transducer array acoustically coupled in the thickness direction, insofar as these are present, and the index number i is a natural number which indicates the number of these further layers of the transducer array, and in that the transducer array comprises at least the oscillation element and a vessel wall section in the region of the oscillation element, and also, optionally, further parts which are arranged preferably in the thickness direction of the oscillation element and are acoustically coupled to the oscillation element and/or the vessel wall section. With respect to natural number, 0 is thus included, i.e. i={0; 1; 2; 3; 4; . . . } applies.

If, for example, a transducer array consists only of the oscillation element and the vessel wall section acoustically coupled thereto in the region of the oscillation element (hereinafter referred to as "trivial transducer array"), it is advantageous if the equivalent wall thickness $c_{equ}=c_o+\Delta c/3$ of the vessel in the region of the oscillation element and the thickness of the oscillation element p are selected in such a way that the resulting natural resonance frequencies of the transducer array lie outside the desired frequency f of the ultrasonic field. In this way, it can be prevented that injected energy of the oscillations remains in the transducer array, i.e. in the vessel wall, the oscillation element or the oscillation elements.

Furthermore, for a trivial transducer array, it is particularly advantageous if the thickness of the equivalent vessel wall section in the region of the oscillation element $c_{equ}=c_o+\Delta c/3$ and the thickness of the oscillation element p are dimensioned such that the quarter-wave number extending over these two layers approaches an odd integer as closely as possible when the oscillation element is excited at a frequency f. This can effectively prevent natural resonance frequencies of the transducer array from being hit.

Accordingly, it is equally advantageous if the frequency f is selected in such a way that the quarter-wave number of a trivial transducer array extending over the equivalent wall thickness $c_{equ}$ and the thickness p of the oscillation element corresponds as far as possible to an odd integer. In this case, the thickness of the oscillation element p and equivalent thickness of the vessel wall section in the region of the oscillation element $c_{equ}$ can already be selected during construction in such a way that this is fulfilled when the oscillation element is excited at a predetermined frequency f.

One thickness-polarized piezoelectric plate (or a plurality thereof) may be selected as the oscillation element. In order to achieve the best possible electrical excitability, the thickness p of such a plate is advantageously selected so that it corresponds to essentially half a wavelength or an integral odd multiple of half a wavelength in the polarization direction of the piezoceramic for the vicinity of an operating frequency f to be intended.

Preferably, it is provided that the thickness p of the oscillation element is selected such that it corresponds essentially to half a wavelength, i.e. to the value $v_P/(2f)$, wherein $v_p$ is the sound velocity in the direction of thickness in the oscillation element, and/or that the frequency f is selected such that the thickness p of the oscillation element corresponds essentially to the value $v_P/(2f)$ and $v_p$ is the sound velocity in the oscillation element. This is particularly advantageous if the oscillation element has a substantially constant thickness p—i.e. it is designed with mutually parallel lateral surfaces. In this way, it can be achieved that the oscillation element is operated as efficiently as possible. In this sense, it is also particularly advantageous if the frequency f is selected so that it is a resonance frequency of the oscillation element.

In this case, it is particularly advantageous if the width b of the oscillation element is in the range between $(r_P \cdot p \cdot v_C/v_P)^{1/2}$ and $4 \cdot (r_P \cdot p \cdot v_C/v_P)^{1/2}$, preferably between $1.5 \cdot (r_P \cdot p \cdot v_C/v_P)^{1/2}$ and $3.5 \cdot (r_P \cdot p \cdot v_C/v_P)^{1/2}$ and particularly preferably between $2 \cdot (r_P \cdot p \cdot v_C/v_P)^{1/2}$ and $3 \cdot (r_P \cdot p \cdot v_C/v_P)^{1/2}$, in order to obtain an optimum excitability of a radial oscillation pattern in the interior of the vessel, wherein $r_P=r_o+c_o$ applies, $r_o$ is the inner radius of the interior, $c_o$ is the minimum wall thickness of the vessel wall section in the region of the oscillation element, and $v_C$ is the sound velocity in the vessel wall section.

Further, in this case, it is particularly advantageous for a trivial transducer array if the equivalent thickness $c_{equ}=c_o+\Delta c/3$ of the vessel wall section in the region of the oscillation element corresponds approximately to an integer odd multiple of a quarter wavelength in this vessel wall section. Accordingly, it is preferably provided that the equivalent thickness $c_{equ}=c_0+\Delta c/3$ of the vessel wall section in the region of the oscillation element is selected to correspond substantially to an integral odd multiple of $(p/2)(v_C/v_P)$, and/or that the frequency f is selected such that the equivalent wall thickness $c_{equ}=c_0+\Delta c/3$ corresponds approximately to an integral odd multiple of $(p/2)(v_C/v_P)$, wherein $v_C$ is the sound velocity in the vessel wall section. In this case, the equivalent wall thickness $c_{equ}$ can already be selected during the construction of the vessel in such a way that this condition is fulfilled when the oscillation element is excited with a predetermined frequency f.

Accordingly, it follows from the preferred correspondence $p=v_P/(2f)$ and the relation $\Delta c=(b^2/4+r_P^2)^{1/2}-r_P$, that the minimum thickness $c_o$ of the vessel wall section in the region of the oscillation element of a trivial transducer array is preferably determined according to the condition $$c_o \approx (2n+1) \cdot p \cdot (v_C/v_P)/2 - \left((b^2/4 + r_P^2)^{1/2} - r_P\right)/3$$

wherein (2n+1) is any odd positive integer.

Furthermore, it can be provided that the vessel outside the region of the oscillation element and at least at the level of the oscillation element has a wall thickness c which corresponds approximately to an integral odd multiple of a quarter wavelength in this vessel wall section. Accordingly, it can also be provided that the frequency f is selected such that the wall thickness c of the vessel outside the region of the oscillation element and at least at the level of the oscillation element corresponds approximately to an integral odd multiple of a quarter wavelength in this vessel wall section. In this case, the wall thickness c can also be selected already during construction in such a way that this is fulfilled when the oscillation element is excited with a predetermined frequency f.

In other words, $c \approx (2n+1) \cdot v_C/4f$ applies. The production of the vessel, for example, as a tube with a wall thickness of approximately an odd multiple of a quarter wavelength is advantageous, since acoustic losses due to natural resonance behavior of the vessel can thereby be minimized even outside the range of the piezo plate.

Additional layers (coupling layers) can be arranged between the oscillation element and the vessel wall section, for example adhesive layers, layers made of glass, ceramics or metal, or also layers formed from ultrasound gel. In order to optimize the oscillation behavior, it is advantageous if the thicknesses $d'_1$ to $d'_j$ of coupling layers of the transducer array, which are arranged acoustically coupled in the thickness direction between the oscillation element and the vessel wall section, and the minimum wall thickness $c_o$ of the vessel wall section are selected so that the condition $$c_0/v_C + \left((b^2/4 + r_P^2)^{1/2} - r_P\right)/(3v_C) + d'_1/v_{d'1} +$$
$$d'_2/v_{d'2} + \ldots + d'_j/v_{d'j} = \rho/v_P \cdot \left(\frac{1}{2} + q \pm \Delta q\right)$$

is fulfilled, wherein $v_{d'1}$ to $v_{d'j}$ are the sound velocities of the coupling layers, wherein the index number j is a natural number indicating the number of coupling layers of the transducer array arranged between the oscillation element and the vessel wall section, and q is a natural number, and the tolerance value $\Delta q$ is at least less than 0.3, preferably less than 0.2, and particularly preferably less than 0.1.

Accordingly, it is also advantageous if at least one coupling layer is arranged between the oscillation element and a vessel wall section in the region of the oscillation element, the minimum wall thickness $c_o$ of the vessel wall section and the thickness d' of the coupling layer are such that the condition $$c_0/v_C + ((b^2/4 + r_P^2)^{1/2} - r_P)/(3v_C) + d'_1/v_{d'1} + d'_2/v_{d'2} + \ldots + d'_j/v_{d'j} = \rho/v_P \cdot \left(\frac{1}{2} + q \pm \Delta q\right)$$

is fulfilled, wherein $v_{d'1}$ to $v_{d'j}$ are the sound velocities of the coupling layers, wherein the index number j is a natural number which indicates the number of coupling layers of the transducer array, and q is a natural number, and the tolerance value $\Delta q$ is at least less than 0.3, is preferably less than 0.2, and is particularly preferably less than 0.1.

It may also be provided that the coupling layer is of negligible thickness, i.e. d' is substantially equal to 0, or that no coupling layer is provided and the acoustic transition between the oscillation element and the vessel wall is ensured in a direct manner (for example by pressing, vacuumization, or fusion).

Furthermore, it can be provided that the thicknesses $d''_1$ to $d''_k$ of outer layers of the transducer array acoustically coupled in the thickness direction, which are arranged on the side of the oscillation element facing away from the vessel, are selected such that the condition $$d''_1/v_{d''1} + d''_2/v_{d''2} + \ldots + d''_k/v_{d''k} = \rho/v_P \cdot (s \pm \Delta s)$$

is fulfilled, wherein $v_{d''1}$ to $v_{d''k}$ are the sound velocities of the outer layers, wherein the index number k is a natural number indicating the number of outer layers of the transducer array which are arranged on the side of the oscillation element facing away from the vessel, and s is a natural number, and the tolerance value $\Delta s$ is at least less than 0.3, preferably less than 0.2, and particularly preferably less than 0.1.

Accordingly, it can also be provided that acoustically coupled outer layers of the transducer array are arranged on the side of the oscillation element facing away from the vessel, the thicknesses $d''_1$ to $d''_k$ of which are selected such that the condition $$d''_1/v_{d''1} + d''_2/v_{d''2} + \ldots + d''_k/v_{d''k} = \rho/v_P \cdot (s \pm \Delta s)$$

is fulfilled, wherein $v_{d''1}$ to $v_{d''k}$ are the sound velocities of these outer layers, wherein the index number k is a natural number indicating the number of outer layers of the transducer array, and s is a natural number, and the tolerance value $\Delta s$ is at least less than 0.3, preferably less than 0.2, and particularly preferably less than 0.1.

In this way, it can be achieved that the electrical excitability of the oscillation element is optimally maintained. Outer layers can be made of a wide variety of materials, such as metal, glass or ceramics. Adhesive layers in between can also represent outer layers. Thicknesses mean their thicknesses in the direction of the thickness p of the oscillation element. If several layers are provided, acoustically hard and acoustically soft layers can be arranged alternately along their thickness extension. This is especially advantageous when acoustic isolation from the environment is to be achieved. Acoustically hard (or acoustically soft) means materials having a comparable or higher acoustic impedance (or a lower acoustic impedance) than the oscillation element, wherein the acoustic impedance is given by $\rho \cdot v$, and $\rho$ indicates the density (the specific gravity) and v the sound velocity of the material. The layers preferably extend over the entire side of the oscillation element, or the adjacent layer or layers. The natural number again also includes 0, as in further consequence, i.e. s={0; 1; 2; 3; ... } applies.

It may further be provided that the vessel has, outside the region of the oscillation element and at least at the level of the oscillation element, a wall thickness c which satisfies the condition $c = v_C/2f \cdot (\frac{1}{2} + m \pm \Delta m)$, wherein m is a natural number, and the tolerance value $\Delta m$ is at least less than 0.3, is preferably less than 0.2, and is particularly preferably less than 0.1.

Accordingly, it may also be provided that the frequency f is selected such that the condition $c = v_C/2f \cdot (\frac{1}{2} + m \pm \Delta m)$ is fulfilled, wherein m is a natural number, and the tolerance value $\Delta m$ is at least less than 0.3, preferably less than 0.2, and particularly preferably less than 0.1, and that the wall thickness c is that of the vessel outside the region of the oscillation element.

To excite the oscillation element, it can be provided that the oscillation element is connected to at least one signal generator which excites the oscillation element with at least one frequency f. The signal generator supplies the oscillation element with a signal which sets the oscillation element into a defined oscillation. For example, this can be an AC voltage source which excites a piezo element as an oscillation element with one or more frequencies.

It is particularly advantageous if the signal generator has a control circuit for measuring at least the voltage amplitude, or current amplitude, or the phase relationship between current and voltage amplitude of the emitted signal, or a combination of these electrical quantities, and is set up to fine-tune the frequency f of the ultrasonic field to a resonance frequency $f_{opt}$ of the device filled with the liquid, which is determined from these measured quantities.

Accordingly, it may also be advantageous if the signal generator measures at least the voltage amplitude, or current amplitude, or the phase relationship between current and voltage amplitude of the emitted signal, or a combination of these electrical quantities, via a control circuit, and fine-tunes the frequency f to a resonance frequency $f_{opt}$ of the device filled with the liquid, which is determined from these measured quantities.

Since the electrical excitability of an acoustic system is particularly high at resonance frequencies $f_{res}$ of the entire acoustic system (i.e. resonance frequencies which occur only with the liquid in the interior), excitation of the oscillation element at a resonance frequency $f_{res}$ of the acoustic system is particularly desirable (in contrast to excitation at a natural resonance $f_{er}$ of the transducer array and/or the vessel). Thus, it is advantageous if the operating frequency f is tuned to such a resonance frequency $f_{opt}$ of the acoustic system which lies outside the ranges of the natural resonances $f_{er}$ of the transducer array. This avoids causing the transducer array to oscillate without further transmitting the energy into the fluid within the interior of the vessel.

When a resonance frequency $f_{res}$ is chosen as the operating frequency, the active power consumption $P_{\mathit{eff}}$ of the acoustic system reaches a local maximum $P_{max}$:

$$P_{\mathit{eff}}(f_{res}) = P_{max}$$

In the case of piezoelectric excitation, the detection of a resonance frequency can thus be performed by means of an active power measurement bridge between the electrical signal source and the piezoelectric plate; e.g. by time averaging (symbolized by < >) the analog multiplication of the AC voltage signal U(f) by the AC current signal I(f), or in the case of sinusoidal AC signals also by measuring the voltage amplitude $U_o(f)$, the current amplitude $I_o(f)$, and the phase relationship $\vartheta(f)$ between the AC voltage signal and AC current signal:

$$P_{max} = <U(f_{res}) \cdot I(f_{res})> = \frac{1}{2} \cdot U_o(f_{res}) \cdot I_o(f_{res}) \cdot \cos(\vartheta(f_{res}))$$

When excited by an impressed AC electrical signal (i.e., with the voltage amplitude $U_o$ held constant, the resonance frequency of the entire acoustic system is that frequency $f_{res}$ at which the electrical conductance G(f) of the entire system (i.e., in the presence of medium between the transducers, or between the transducer array and the reflector) reaches a local maximum:

$$P_{max} = U_o^2 \cdot G(f_{res})$$

Analogously, when excited by an impressed alternating current signal (i.e. with constant current amplitude $I_o$), the resonance frequency $f_{res}$ is the frequency at which the electrical resistance R(f) of the overall system reaches a local maximum:

$$P_{max} = I_0^2 \cdot R(f_{res})$$

In principle, it is advantageous if one or more preferred operating frequencies f or a frequency band in which the device is to be operated are determined before the device or the vessel and oscillation element are constructed. The above calculations can thus be used to calculate the dimensions for the vessel and oscillation element, so that natural resonances of the transducer array can be avoided and optimum energy transfer can be ensured. However, since the exact position of the resonance frequency $f_{opt}$ depends on a large number of parameters, such as the exact dimensions of the transducer array within the manufacturing tolerances, the temperature or the type of liquid, etc., it may be advantageous to determine the optimum operating frequency f (i.e. the resonance frequency $f_{opt}$ of the acoustic system) after construction before or during operation of the device, and to excite the oscillation element primarily or exclusively at this frequency.

The device may also comprise more than one vessel, wherein the vessels are preferably connected in parallel to each other, but may also be connected in series. In this way, the size of the vessels can be kept small and yet an increase in the amount of liquid to be treated can be achieved.

An oscillation element may also be connected to more than one vessel, thereby exciting more than one vessel.

Preferably, the vessel is made of glass, preferably borosilicate glass, at least in the region of the oscillation element. Equally preferably, the vessel is made of biocompatible plastic or plastics. It may also be provided that the vessel, at least outside the region of the oscillation element, is made of biocompatible plastic.

It is particularly advantageous if the vessel is separably connected to the oscillation element, for example that an acoustic coupling is established via ultrasonic gel. In this way, the vessel can be intended for single use, while the oscillation element can be reused. This is particularly advantageous for sensitive substances such as biologically active cells in a nutrient medium, as contamination can be prevented.

In the following, it will be explained by way of example how, given a desired operating frequency, suitable dimensions for producing the inner radius and general and minimum wall thickness of a carrier tube serving as a vessel, as well as the thickness and width of a piezo plate serving as an oscillation element, are determined in accordance with the invention:

The starting point is a preferred operating frequency of about 1.7 MHz empirically found for an application to an aqueous suspension, a radius $r_P$=17 mm defining the approximate size, and a carrier tube wall thickness of at least 4 mm required for hydrostatic pressure resistance.

For the carrier tube serving as the vessel according to the invention at the level of the oscillation element, technical borosilicate glass is selected from a number of possible materials (glass, ceramics, stainless steel, but also thin-walled plastics such as PEEK, polycarbonates, polyethylenes and polystyrenes, or other e.g. biocompatible plastics, ceramics or metals). Two identical mirror-image PZT piezoceramics are chosen as sound-generating elements.

According to the material data sheet, the following material parameters are given:

Sound velocity medium (water): $v_M$=1500 m/s
Sound velocity of the carrier tube: $v_C$=5640 m/s
Sound velocity of the piezo plate: $v_P$=4100 m/s (for longitudinal oscillation mode in the direction of the thickness p of the plate).

It follows therefrom:

Thickness of the oscillation element: $p \approx v_P/(2f)$=1.2 mm (for optimum excitation of the piezoelectric oscillation element in its fundamental mode of thickness oscillation)

Width of the oscillation element: $b \approx 2 \cdot (r_P \cdot v_C/f)^{1/2}$=15 mm Minimum vessel wall thickness: $c_o \approx (2n+1) \cdot p \cdot (v_C/v_P)/2 - ((b^2/4 + r_P^2)^{1/2} - r_P)/3$=2.0 mm (for odd multiples 2n+1=3)

Tube wall thickness: $c \approx (2n+1) \cdot v_C/4f$=4.2 mm (for odd multiples 2n+1=5)

Inner radius: $r_o = r_P - c_o$=15 mm

BRIEF DESCRIPTION OF THE DRAWING

In the following, the invention will be explained in more detail with reference to non-limiting exemplary embodiments shown in the figures, wherein:

FIG. 6A shows a vessel of a device according to the invention in a fifth embodiment having three oscillation elements in cross-section;

FIG. 6B a vessel of a device according to the invention in a sixth embodiment with six oscillation elements in cross-section;

FIG. 6C shows an array of a plurality of vessels of a device according to the invention in a seventh embodiment;

DETAILED DESCRIPTION

Figure 1A:
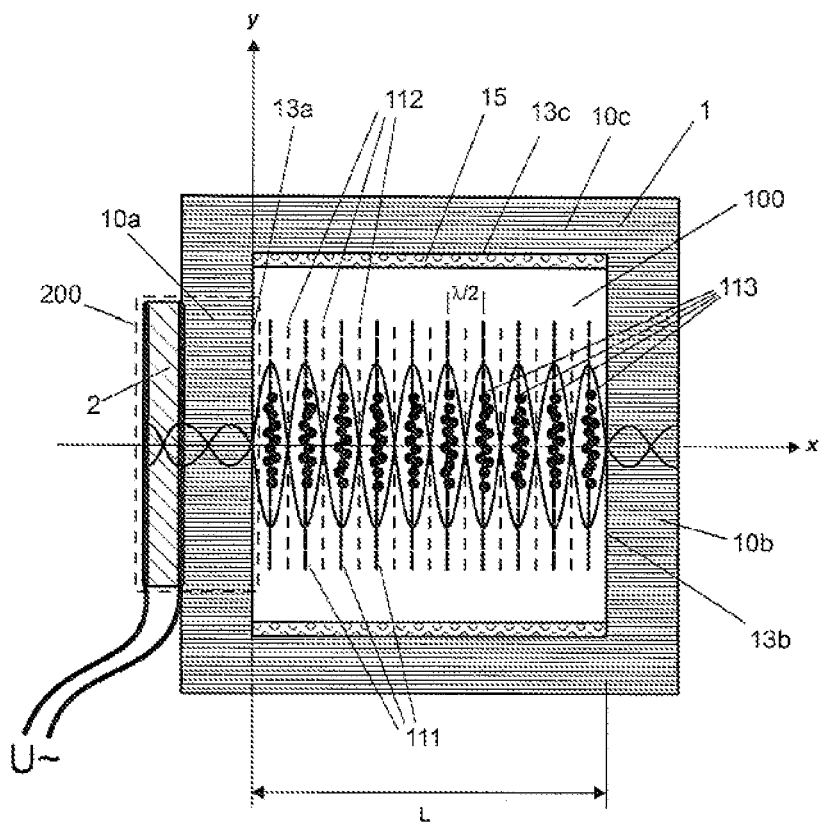
FIG. 1A shows a prior art vessel having a square cross-section.
Figure 1B:
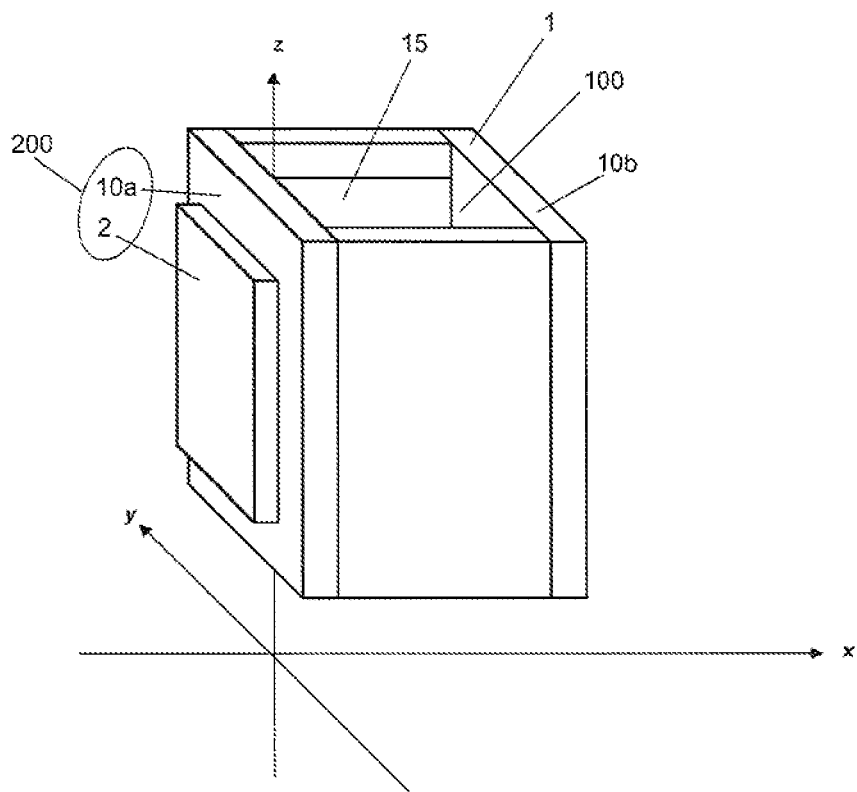
FIG. 1B shows a side view of the vessel of FIG. 1A.

FIGS. 1A and 1B illustrate a typical prior art acoustic device for producing a flat standing acoustic field in a vessel 1 filled with a dispersion 100. The dispersion 100 represents a liquid (the dispersion medium) and particles such as cells contained therein. The transducer array 200 is formed by a flat piezoelectric oscillation element 2 coated with electrode surfaces, and by a flat vessel wall 10a. The oscillation element 2 is acoustically precisely coupled to the vessel wall 10a from the outside (e.g. by bonding of precisely defined often highly thin layer thickness, or by an interposed acoustically coupling gel or liquid layer). The opposite reflecting, likewise flat vessel wall 10b serves as an acoustic reflector wall and is oriented with its inner surface 13b parallel to the emitting surface 13a of the transducer array. Between transducer wall 10a and reflector wall 10b, a parallel pattern of alternating sonic bulge planes 111 and sonic node planes 112 is formed in dispersion 100. Adjacent nodes and bulges are spaced apart by a quarter wavelength; the bulge-to-bulge or node-to-node spacing is half a wavelength.

Depending on the acoustic contrast and specific gravity of the particles relative to the dispersion medium, acoustic radiation forces drive the dispersed particles (which may be solid, liquid, or gaseous) into the sonic bulge planes 111 and sonic node planes 112, respectively. Accordingly, most solid particles (as shown here) are driven into the sonic bulge planes, while gaseous particles (bubbles) would collect in the sonic node planes.

In the illustrated embodiment, the acoustic field is generated by applying an AC voltage U~ to the electrodes of the oscillation element 2. If an integer multiple of half wavelengths fits into the acoustic system (formed here by transducer array dispersion reflector wall), the standing wave field is in resonance and the system can be excited particularly effectively. If the distance L between the transducer wall 10a and the reflector wall 10b is significantly greater than the thickness of the transducer array or the reflector wall, the frequency spacing $\Delta f_{res}$ between adjacent resonance frequencies can be approximately estimated by the relationship $\Delta f_{res}=v_M/(2L)$, wherein $v_M$ is the sound velocity of the medium of dispersion 100.

The vessel walls (transducer wall 10a, reflector wall 10b, side walls 10c) are typically made of glass or metal. As a possible measure for attenuating randomly excited transverse standing wave fields, the inner surfaces 13c of the side walls are shown here with an acoustically attenuating coating 15. Suitable materials for such a coating include silicone, rubber, and other materials compatible with the medium such as biocompatible plastics. Alternatively, the entire sidewall 13c, or all of the vessel walls if sufficiently thin, may be made of application-specific suitable plastics (e.g., forms of PEEK, polycarbonates, polyethylenes, polypropylenes, polystyrenes, etc.). Likewise, depending on the material, the vessel may also be cast, injection molded, fused, or milled in one piece. These embodiments regarding the material and the cushioning coating may also apply to embodiments according to the invention.

Figure 2A:
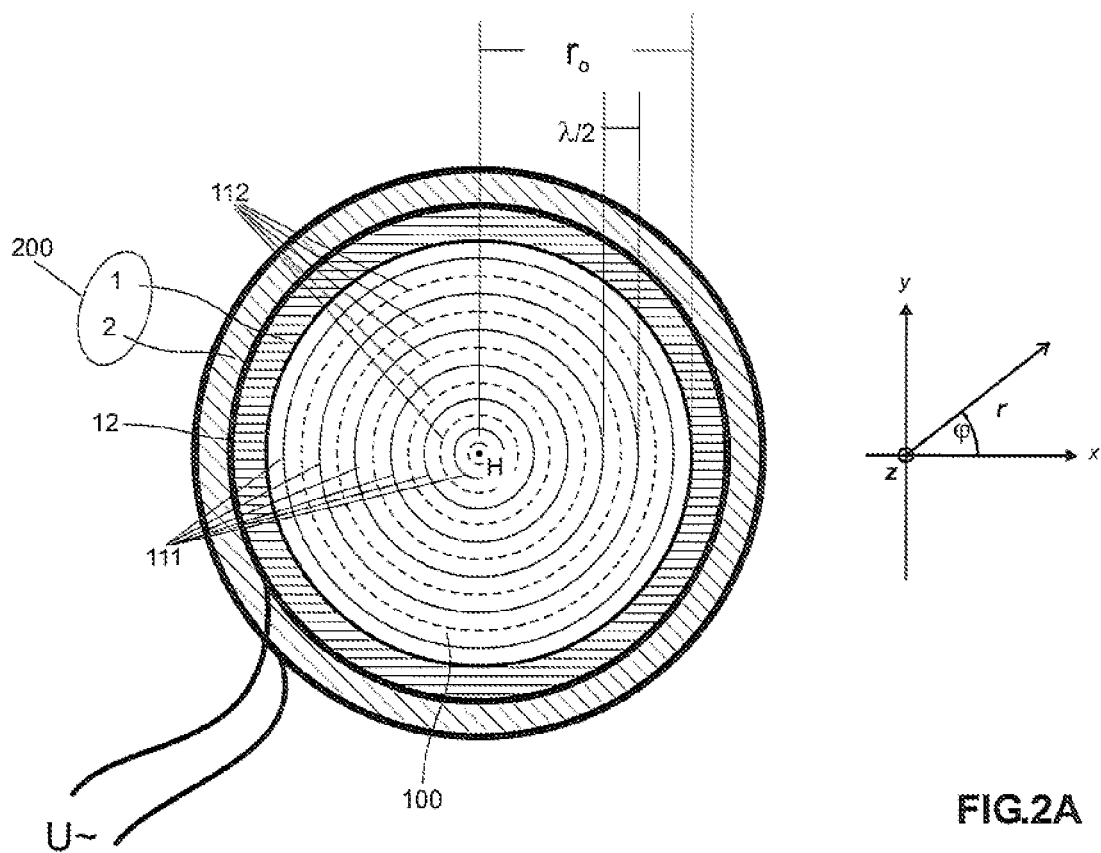
FIG. 2A shows a vessel according to the prior art having a circular cross-section and an oscillation element extending continuously around the cross-section.

Analogous to FIG. 1A, FIG. 2A illustrates the fundamental structure of a device according to the prior art for producing a circular-cylindrical standing acoustic field. The vessel 1 is circular-cylindrical and continuously surrounded on an outside wall 12 by an equally circular-cylindrical oscillation element 2, which is designed as a piezoelectric tube. The cylinder axis or main axis H lies in the viewing direction z of the observer. The transducer array 200 is formed by the piezoelectric tube 2 and by the vessel 1 enclosed therein and serving as a carrier tube. The piezoelectric tube and the carrier tube are acoustically coupled to each other (e.g., by bonding, or by an interposed acoustically coupling gel or liquid layer). Within the carrier tube, a parallel pattern of alternating sonic bulge cylindrical shell surfaces 111 and sonic node cylindrical shell surfaces 112 is formed in the dispersion medium or liquid 100. Adjacent node shell surfaces and bulge shell surfaces are spaced apart by a quarter wavelength in the fluid 100; the spacing of adjacent bulge-bulge shell surfaces and node-node shell surfaces, respectively, is one-half wavelength λ/2.

In the illustrated embodiment, the acoustic field is generated by applying an AC voltage U~ to the electrodes of the piezoelectric tube 2. If an integer multiple of half wavelengths fits into the acoustic system (here formed by transducer array medium), the standing wave field is in resonance and the system can be excited particularly effectively. If the inner radius $r_o$ of the carrier tube 1 is significantly greater than the wall thickness of the transducer array 200, the frequency spacing $\Delta f_{res}$ between adjacent resonance frequencies can be estimated approximately by the relationship $\Delta f_{res}=v_M/(2r_o)$, wherein $v_M$ is the sound velocity of the medium.

Due to the concentric excitation of the circular-cylindrical standing wave field, the acoustic energy density is inversely proportional to the distance r between the cylinder axes. Due to the increasing acoustic energy density, the pressure amplitude and thus the risk of cavitation in the area of the cylinder axis H also increases significantly. Especially for the separation of living cells, this poses a risk to the viability of the cells.

Figure 2B:
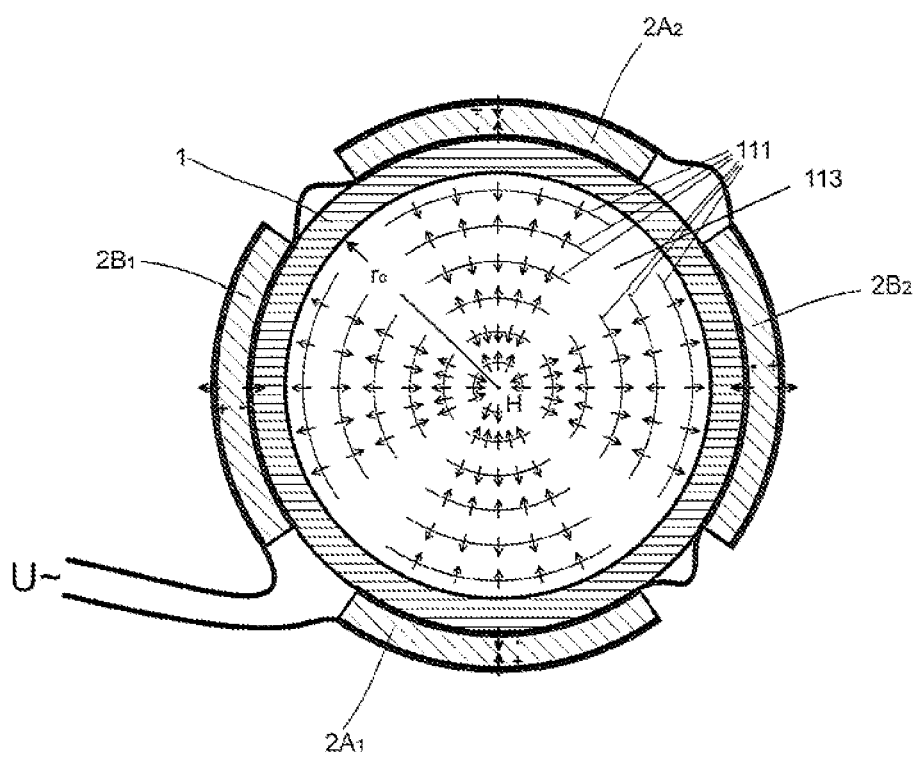
FIG. 2B shows a vessel according to the prior art having a circular cross-section and a plurality of curved oscillation elements distributed about the cross-section.

FIG. 2B illustrates a measure for reducing this risk of cavitation along the cylinder axis H, which is known from the prior art. In the illustrated variant of the cylindrical device, the piezo tube is divided into four cylinder shell segments, resulting in four oscillation elements $2A_1$, $2A_2$, $2B_1$, $2B_2$ which are curved in cross-section. They are electrically wired in such a way that the excitation of two opposing piezo shell segments is synchronous in time, but the pair of piezo shell segments orthogonal thereto is antisynchronous. That is, while piezo shell segments $2A_1$ and $2A_2$ expand, piezo shell segments $2B_1$ and $2B_2$ contract, and vice versa. This at least partially compensates for the acoustic pressure amplitudes increasing towards the center in the region of the axis, and the risk of cavitation is reduced.

Figure 3A:
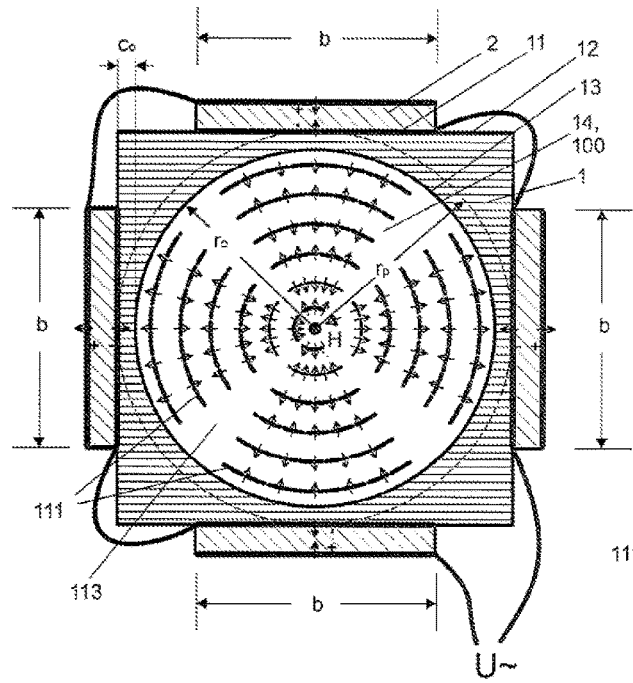
FIG. 3A shows a vessel of a device according to the invention in a first embodiment having four oscillation elements in cross-section.

FIG. 3A shows a possible embodiment variant according to the invention of a vessel 1 according to the device according to the invention, wherein the oscillation elements 2 are designed as flat piezoelectric plates and are acoustically coupled (e.g. by bonding) to connecting walls 11, which are held flat, of an outside wall 12 of the vessel 1 designed as a carrier tube. Thereby, the interior 14 is circular-cylindrical as shown in FIG. 2B, i.e. has a circular cross-section with an inner radius $r_0$. The interior 14 is bounded by a continuous, smooth inner wall 13 of the vessel 1. Outwardly, the vessel 1 has a rectangular, preferably square, cross-section, resulting in an outside wall 12 of four flat partial walls that are parallel or at right angles to each other. Four oscillation elements 2 are arranged centered on each partial wall, whereby the partial walls serve at least partially as connection surfaces. Each partial wall has a minimum wall thickness $c_o$ at which the vessel 1 is thinnest, namely halfway across the width b of each oscillation element 2 and partial wall. This results in a radial distance $r_p$ of the oscillation elements 2 from the main axis H with $r_p=r_o+c_o$.

Figure 3B:
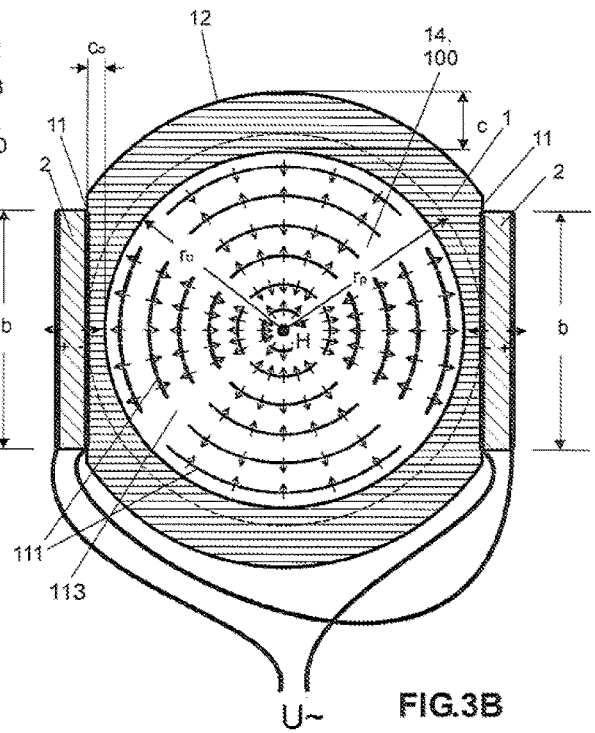
FIG. 3B shows a vessel of a device according to the invention in a second embodiment having two oscillation elements in cross-section.

FIG. 3B shows a second embodiment according to the invention, wherein the vessel 1 has a circular shell and thus cylindrical outside wall 12. Thus, the vessel 1 is essentially a hollow cylinder with an overall wall thickness c. On two sides the outside wall 12 is flattened, resulting in two flat connection surfaces 11. In this embodiment, the connection surfaces 11 are arranged parallel to each other and thus face each other. An oscillation element 2 is arranged on each connection surface 11, which are preferably excited with the same frequency f or the same frequency spectrum. Such an arrangement on two opposite sides is particularly advantageous for vessels which are made of plastic. Possible asymmetries of the wave field in the interior 14 of the vessel caused by damping in the vessel wall can thus be prevented.

For this purpose, the oscillation elements 2 can be electrically connected in series (as shown) or also electrically connected in parallel, wherein in FIG. 3B the polarity of the respective electrical contacting of the oscillation elements is selected in such a way that the oscillation elements expand or contract synchronously. For this purpose, the side of an oscillation element 2 facing away from the vessel 1 is connected to a first signal cable of a signal generator, and the side of the other oscillation element 2 facing towards the vessel 1 is connected to a second signal cable. The other sides of the oscillation elements 2 are connected to each other by a cable. In this case, the negatively polarized side of both oscillation elements 2 faces the vessel 1. In FIG. 3A it can be seen that such an electrical interconnection is of course also possible with several oscillation elements 2.

Due to such a rotationally symmetrical arrangement of a plurality of oscillation elements 2, a standing wave field 111 formed substantially radially about the main axis H occurs in the interior 14 within the dispersion 100 in the region between two oppositely arranged oscillation elements 2, and thus the dispersed particles are compacted. Corresponding compaction also occurs transversely to this region as a result of a standing wave field which is likewise substantially radially formed but oscillates in an inverted manner, as a result of which a weakening of the radial standing wave field can occur in the transition regions 113 between the wave regions, but this is insignificant for the practical functionality of the device.

According to the invention, an effective excitation of an—in spite of the flat formed oscillation elements 2—essentially still dominant cylindrical standing wave field within the interior 14 filled with liquid is possible by the fact that the oscillation elements 2 have a width b which approximately does not substantially exceed the relation $b=2\cdot(r_P\cdot v_C/f)^{1/2}$.

According to the invention, it is sufficient that the width b is less than $3\cdot(r_P\cdot v_C/f)^{1/2}$, and preferably has a value within $(r_P\cdot v_C/f)^{1/2}<b<2.5\cdot(r_P\cdot v_C/f)^{1/2}$, wherein $v_C$ is the sound velocity in the vessel wall section 10 in the region of the oscillation element 2.

For the normally practical case where a piezoelectric plate for excitation at its thickness mode fundamental frequency is used as the oscillation element 2 (i.e., the oscillation element has a thickness $p=v_P/(2f)$, and $v_p$ is the sound velocity in the thickness direction in the oscillation element 2), an embodiment according to the invention of the width b is also given when it is less than $4\cdot(r_P\cdot p\cdot v_C/v_P)^{1/2}$ or preferably within a range $1.5\cdot(r_P\cdot p\cdot v_C/v_P)^{1/2}<b<3.5\cdot(r_P\cdot p\cdot v_C/v_P)^{1/2}$.

Figure 3C:
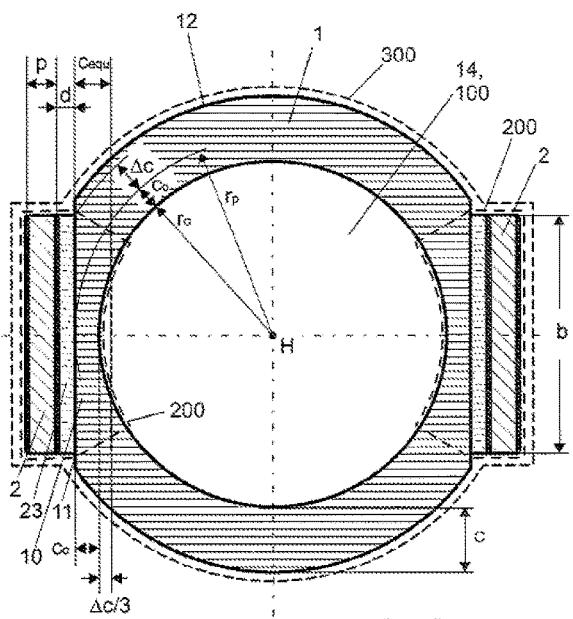
FIG. 3C shows the embodiment of FIG. 3B with detailed designations of the geometric dimensions relevant to the invention.

FIG. 3C illustrates further key geometric dimensions of an embodiment according to the invention, which must be observed in the design in order to optimize the excitation of a circular-cylindrical acoustic field in sufficient approximation despite the use of flat sound emitting oscillation elements 2. The plate-shaped oscillation element 2 has a thickness p and is acoustically connected to the flat connection surface 11 of the outside wall 12 of the vessel via a coupling layer 23 of thickness d (e.g. by bonding, or by an interposed acoustically coupling gel or liquid layer). The oscillation element thus forms, together with the coupling layer 23 and the vessel wall section 10 located in the region of the coupling layer, a transducer array 200 acoustically coupled in the thickness direction of the oscillation element 2. Thereby, the vessel wall section 10 has a minimum wall thickness $c_0$ in its center and a maximum radial wall thickness $c_{max}=c_0+\Delta c$ at the edge of the coupling layer, where the radial wall thickness of $c_0$ has expanded by $\Delta c$. In this embodiment, the total wall thickness c of the vessel is greater than $c_{max}$, since the coupling surfaces 11 are made larger than the width b of the oscillation elements 2, and therefore project beyond them. The difference $\Delta c$ is determined by the width b of the oscillation element (2) via the relationship $\Delta c=(b^2/4+r_P^2)^{1/2}-r_P$.

It is advantageous to define an equivalent thickness $c_{equ}$ for the vessel wall section 10 belonging to the transducer array 200, given by $c_{equ}=c_0+\Delta c/3$, which is substantially equal to the mean radial wall thickness of this vessel wall section 10.

According to the invention, in the embodiment variant illustrated with FIG. 3C, the thickness p of the oscillation element 2, the thickness d of the coupling layer 23, and the equivalent thickness $c_{equ}$ of the vessel wall section 10 have an overall thickness of the transducer array 200, so that the occurrence of natural resonances of the transducer array 200 is avoided when the transducer array 200 is excited at the desired operating frequency f. This is achieved in that the thickness p of the oscillation element, thickness d of the coupling layer 23, and the equivalent thickness $c_{equ}$ of the vessel wall section 10 have values which come as close as possible to the condition $$2f \cdot (c_{equ}/v_c + p/v_P + d/v_d) = 1/2 + n,$$

which is equivalent to the condition that the half-wave number of the acoustic wave extending in the thickness direction over the entire transducer array is as close as possible to no natural number n (0, 1, 2, . . . ). Here, $v_c$ is the sound velocity in the vessel wall section 10 in the region of the oscillation element 2, $v_p$ is the sound velocity in the thickness direction in the oscillation element 2, and $v_d$ is the sound velocity in the coupling layer.

For the normally practical case that a piezoelectric plate for excitation at its thickness mode fundamental frequency is used as the oscillation element 2 (i.e., that the oscillation element has a thickness $p=v_P/(2f)$), and while observing the width b of the oscillation element 2 which is preferable according to the invention and as explained for FIGS. 2A and 2B, the excitation of natural resonances of the transducer array is avoided, in particular, if the minimum thickness $c_o$ of the vessel wall section 10 and the thickness d of the coupling layer have values which satisfy the condition $$c_o/v_c + d/v_d + \left((b^2/4+r_P^2)^{1/2}-r_P\right)/(3v_C) = p/v_P \cdot (1/2+n \pm \Delta n),$$

wherein n is a natural number (0, 1, 2, . . . ), and the tolerance value $\Delta n$ is at least less than 0.3, preferably 0.2, and particularly preferably less than 0.1.

According to the invention, the coupling layer may have a thickness d so thin that it can be neglected and thus d is substantially equal to 0.

In a preferred embodiment of the device according to the invention, the wall thickness c of the vessel 1 around the interior 14 but outside the region of the connection surface 11 satisfies the condition $$c = v_C/2f \cdot (1/2+m \pm \Delta m),$$

wherein m is a natural number (0, 1, 2, . . . ), and the tolerance value $\Delta m$ is at least less than 0.3, preferably 0.2, and particularly preferably less than 0.1. This is equivalent to the condition that the vessel has a wall thickness c in this region which is not equal to an integer multiple of half a wavelength.

For the normally practical case where the oscillation element 2 is a piezoelectric plate for excitation at its thickness mode fundamental frequency (i.e., the oscillation element has a thickness $p=v_P/(2f)$), the condition can also be expressed as $$c = p \cdot v_C/v_P \cdot (1/2+m \pm \Delta m).$$

Figure 3D:
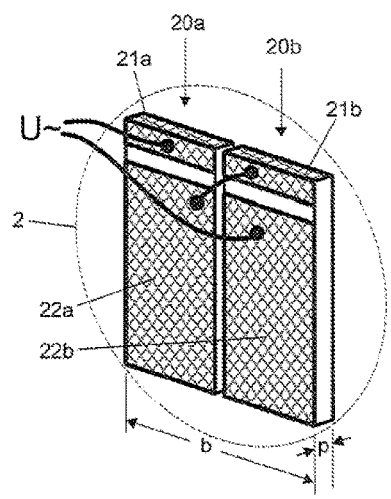
FIG. 3D shows an embodiment of the oscillation element.

FIG. 3D illustrates one of the possible embodiments of the oscillation element 2 according to the invention with thickness p and width b as an arrangement of two piezoelectric plates 20a and 20b of the same thickness p, which are adjacent to each other on the same plane and polarized in the thickness direction. Each of the two plates 20a, 20b has an electrode surface 21a, 21b facing the vessel (vessel not shown here) and an electrode surface 22a, 22b facing away from the vessel. For the purpose of accessibility of electrical contacting, the electrode surfaces 21a, 21b facing the vessel each have a region overlapping on the side facing away from the vessel.

In the embodiment shown here, the electrode surfaces 21a, 21b, 22a, 22b of the two piezo plates 20a and 20b are electrically connected in series with each other and connected to an electrical signal source U~.

It is understood that in alternative embodiments an oscillation element 2 may have only a single piezoelectric plate, or may have a mosaic-like arrangement of any number of piezoelectric plates electrically connected to each other in series, or in parallel, or in a suitable combination thereof, to achieve a suitable overall electrical impedance of the oscillation element 2 for connection to the signal source U~.

Further, a piezoelectric plate may have a plurality of separate electrode surface areas on one or both sides, which in turn are electrically connected to each other in such a way as to achieve a suitable overall electrical impedance of the oscillation element 2. Where a plurality of piezoelectric plates 20a, 20b are provided for the oscillation element 2, they may be directly acoustically connected to each other. For this purpose, it may be provided that the at least two piezoelectric plates are arranged with a base body of the oscillation element. In this respect, the base body may extend substantially only in the region between the piezoelectric plates. This may require that the mean thickness p of the oscillation element corresponds to the thickness of the piezoelectric plates. Alternatively, no main body may be provided and the piezoelectric plates may also be acoustically connected only via the vessel.

Further, the electrical connection between the signal source U~ and one or more piezoelectric plates may also be supported by one or more signal transformers having suitable electrical transformation ratios to provide an overall electrical impedance of the oscillation element 2 suitable for connection to the signal source U~.

Figure 4:
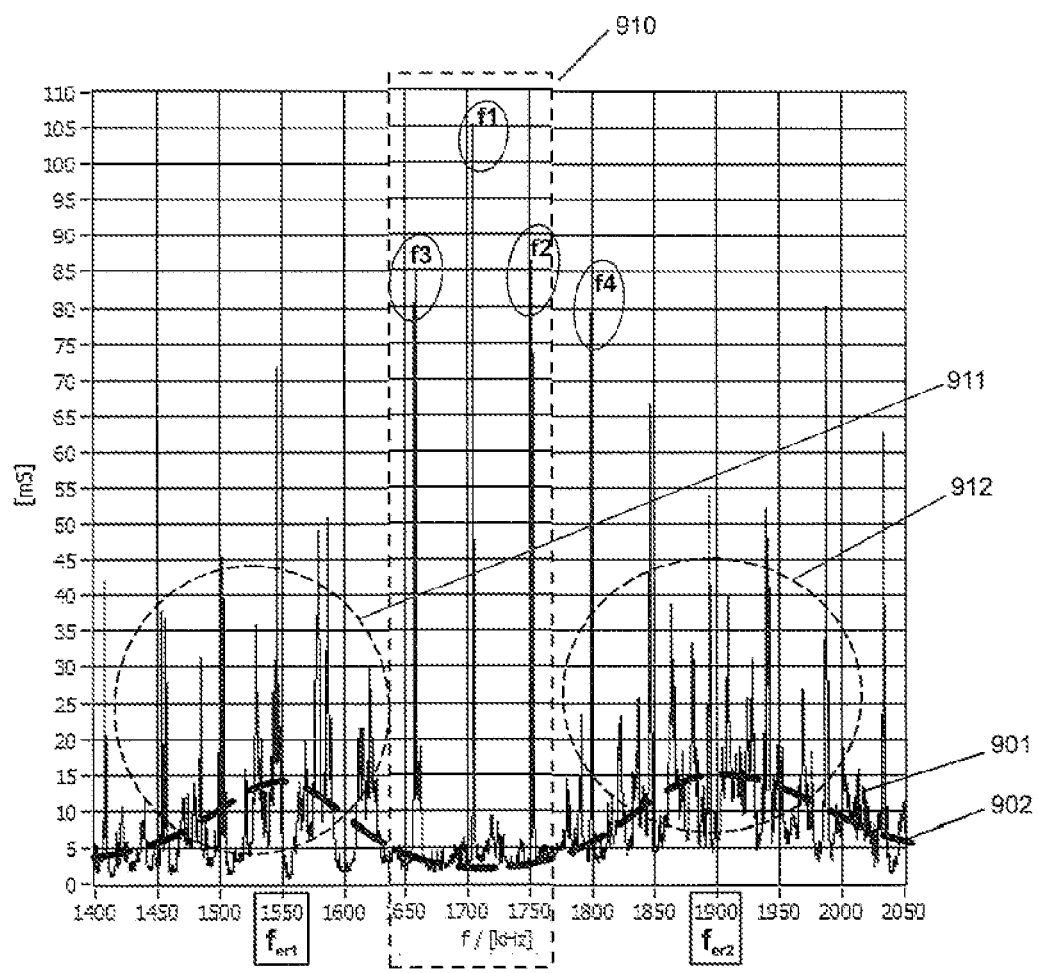
FIG. 4 shows the electrical resonance spectrum of the second embodiment as a function of frequency f.

FIG. 4 presents the frequency response of a device built according to the invention as shown in FIG. 3C, which has dimensions according to the invention that obey the conditions presented for FIG. 3C:

Width of the swing element: b=15 mm

Thickness of the oscillation element: p=1.2 mm (basic thickness mode at 1.7 MHz)

Minimum vessel wall thickness: $c_o$=2.0 mm

General wall thickness: c=4.2 mm

Radii of the vessel: $r_o$=15 mm and $r_P$=$r_o$+$c_o$=17 mm

The coupling layer 23 is formed of a thin liquid cured adhesive whose thickness d is of the order of only one hundredth of a wavelength, and is thus negligible (d≈0). The oscillation element consists essentially of only one piezoelectric plate, whereby the thickness and width of this plate represent the thickness and width of the oscillation element.

Material Parameters:

Sound velocity Medium (water): $v_M$=1500 m/s

Sound velocity of the carrier tube: $v_C$=5640 m/s

Sound velocity of the piezo plate: $v_P$=4100 m/s (for longitudinal oscillation mode in the direction of thickness p of the piezo plate).

A first plot 901 (thin solid line) represents the conductance spectrum of the acoustic system 300 (vessel 1 filled with medium), a second plot 902 (thick dashed line) represents the conductance spectrum of the transducer array 200 (empty vessel 1). In the case of excitation with an alternating electrical signal with primarily impressed voltage amplitude, the first plot 901 is to be equated with the resonance spectrum of the acoustic system 300, while the second plot 912 corresponds to the natural resonance spectrum of the transducer array 200.

In the range of the desired operating frequency of about 1.7 MHz, strongly pronounced radial resonance frequencies f1, f2 and f3 occur at the expected spacing of $\Delta f_{res} \approx v_M/(2r_o)$=50 kHz as a consequence of the production according to the invention. These radial resonance frequencies f1, f2, f3, and to a limited extent also f4 stand out significantly from the remaining non-radial background resonance behavior (typically recognizable by the smaller but dense and irregular resonance peaks), which is particularly pronounced in the frequency ranges 911 and 912 around the natural resonance frequencies $f_{er1}$ (at 1550 kHz) and $f_{er2}$ (at 1900 kHz) of the transducer array.

According to the invention, with a distance of greater than 70 kHz from these two closest natural resonance frequencies $f_{er1}$ and $f_{er2}$ (corresponds to about 20% or one fifth of the frequency separation between these two natural resonance frequencies), the resonance frequencies f1, f2, f3 and f4 of the acoustic system 300 are also sufficiently far away from the natural resonance frequencies of the transducer array, with a distance of more than 105 kHz (corresponds to about 30% of the frequency separation between the two nearest natural resonance frequencies $f_{er1}$ and $f_{er2}$), the frequencies f1, f2, f3 are to be preferred over f4; and among these in turn the frequencies f1 and f2 with a spacing of more than 140 kHz (corresponds to about 40% of the frequency spacing between the two nearest natural resonance frequencies $f_{er1}$ and $f_{er2}$).

Preferably, the alternating electrical signal source includes a device for:

(1) detecting resonance frequencies (such as by directly measuring the active electrical power absorbed by the vessel 1, thus detecting the frequencies for which there are local maxima of absorbed active power) and/or (2) for automated frequency tuning to such resonance frequencies of maximum active electrical power absorption by the acoustic system 300.

With such a device, it is therefore possible to manually or even automatically fine-tune the operating frequency f to the preferred resonance frequency of the acoustic system 300 that most closely matches the assumed operating frequency (in this example, 1.7 MHz) on which the design is based.

It is remarkable that in the example presented, pronounced and largely mode-free radial resonances are formed only within a relatively narrow frequency range 910 of about 1650 to 1750 kHz; a clear indication that only for this narrow frequency range around 1.7 MHz a largely mode-pure cylindrical standing wave field is built up in the radial direction, in which no significant coupling with standing wave fields dependent on other dimensions occurs.

It should be emphasized that over the entire measured range from 1400 kHz to 2050 kHz, far-reaching mode-pure excitation of a radial standing acoustic cylinder field is possible only at f1, f2, and f3 (i.e., at only 3 of about 15 possible radial resonance frequencies); it is therefore very unlikely that with only random selection of the values for width b and thickness p of the piezo plate, as well as minimum and other wall thicknesses of the carrier tube ($c_o$ and c), a mode-pure radial resonance frequency could be found afterwards purely by frequency tuning, which would come sufficiently close to the desired operating range around 1.7 MHz, and at the same time would be sufficiently far away from natural resonances of the transducer array. This underlines that the present invention is indeed a device.

Figure 5A:
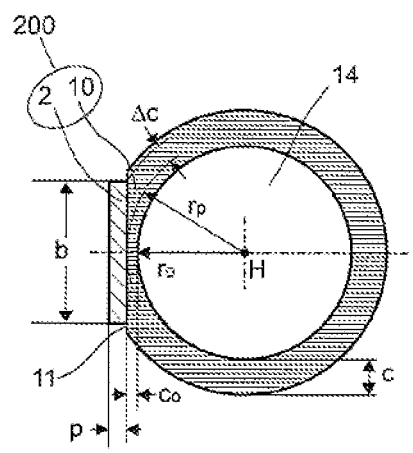
FIG. 5A shows a vessel of a device according to the invention in a third embodiment having only one oscillation element in cross-section.
Figure 5B:
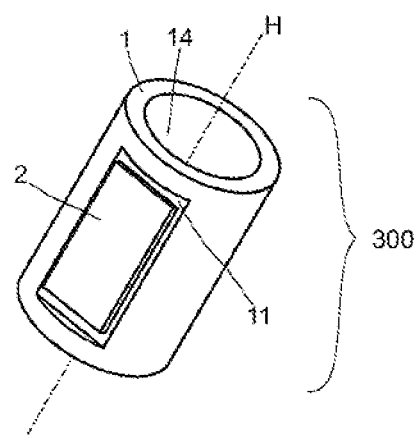
FIG. 5B shows a side view of the vessel of FIG. 5A.

For vessels 1 with smaller circular-cylindrical inner diameter 14 (typically less than 50 wavelengths in the medium at operating frequency), it is sufficient for many only weakly attenuating dispersions (such as aqueous suspensions with a solids content of typ. <10% v/v) to excite the acoustic system 300 only on one side. By way of example, FIGS. 5A and 5B illustrate such a one-sided-only configuration of the vessel 1, which is designed as a circular-cylindrical tube, with piezoelectric excitation on one side only. The criteria according to the invention for the design of the thickness and width of the oscillation element 2, as well as the general wall thickness and minimum wall thickness of the carrier tube (i.e. for b, p, c and $c_o$) remain as described for FIG. 3C.

In this regard, it is visible in FIG. 5B that the oscillation element 2 extends over a major part of the section of the vessel 1 which has a round cross-section. In this case, however, the oscillation element 2 does not extend to the ends of these sections—nor do the connection surfaces 11 extend as far—but this may be provided in alternative embodiments. This also applies to other embodiments with several oscillation elements 2.

Figure 5C:
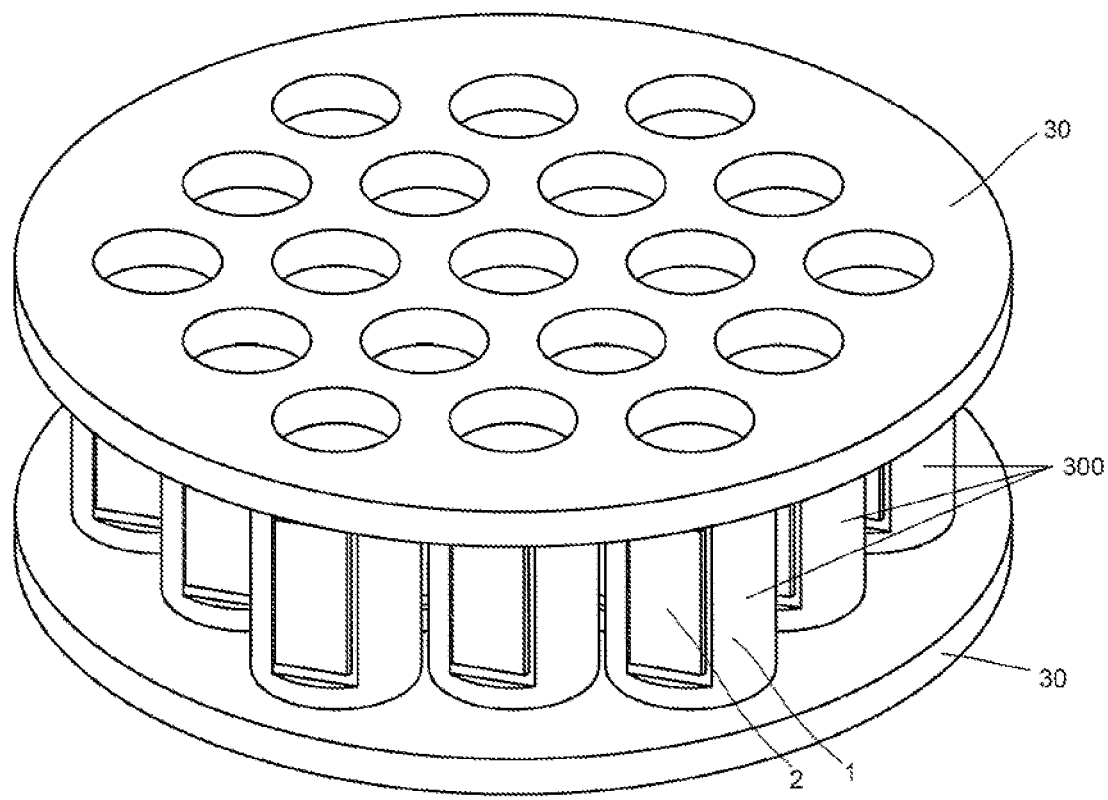
FIG. 5C shows an array of a plurality of vessels of a device according to the invention in a fourth embodiment.

FIG. 5C illustrates one way of increasing the total flow cross-section by arranging a plurality of circular-cylindrical vessel tubes 1 in parallel, each fitted with an oscillation element 2. Alternatively, of course, in other embodiments, the fitting of a plurality of oscillation elements 2 may be provided. If all vessel tubes 1 and oscillation elements 2 are of identical construction, the oscillation elements 2 may be electrically interconnected (e.g. serially, in parallel, or in a combination thereof) and operated by a common alternating electrical signal. For uniform separation performance of all such parallel acoustic systems 300 when operated from a common electrical source, it is advantageous if the inner diameters of the carrier tubes 1 differ from each other by at least no more than 0.3%, preferably no more than 0.1%; and if the minimum wall thicknesses $c_o$ of the carrier tubes 1 and the thicknesses p of the oscillation elements 2 differ from each other by at least no more than 5%, preferably no more than 2%. The individual vessel tubes 1 are held at their ends in two receiving plates 30.

FIGS. 6A and 6B show by way of example further embodiments according to the invention with acoustic excitation from more than 2 directions, here for 3 and 6 directions, respectively. Common to all such star-shaped forms of excitation from 3 or more directions is that the piezo plates are of identical size, these are arranged rotationally symmetrical to the axis of the circular-cylindrical interior 14 of the carrier tube, and for the dimensions of the oscillation elements 2 and of the vessel (i.e. for b, p, and $c_o$) the same geometrical criteria according to the invention apply as in the case described for FIG. 3C, so that an essentially cylindrical acoustic standing wave field can likewise be formed, the rotationally symmetrical wave antinode/wave node periodicity of which in all excitation directions can again be described essentially alone by the one-dimensional radial dimension r.

In the embodiments shown in FIG. 6A-C, the oscillation elements are of the same thickness p and the same width b. In alternative embodiments, however, oscillation elements of different sizes may also be provided.

FIG. 6C illustrates a coupling of several parallel acoustic vessels 1 according to FIG. 6B into a honeycomb-shaped arrangement acoustically coupled via the oscillation element 2 as a way of increasing the total flow cross-section and further uniform acoustic energy distribution when operating on a common alternating electrical signal. In this regard, two vessels 1 are adjacent to each oscillation element 2, wherein each vessel 1 located inside the honeycomb-like structure is adjacent to a total of six oscillation elements 2.

Figure 7A:
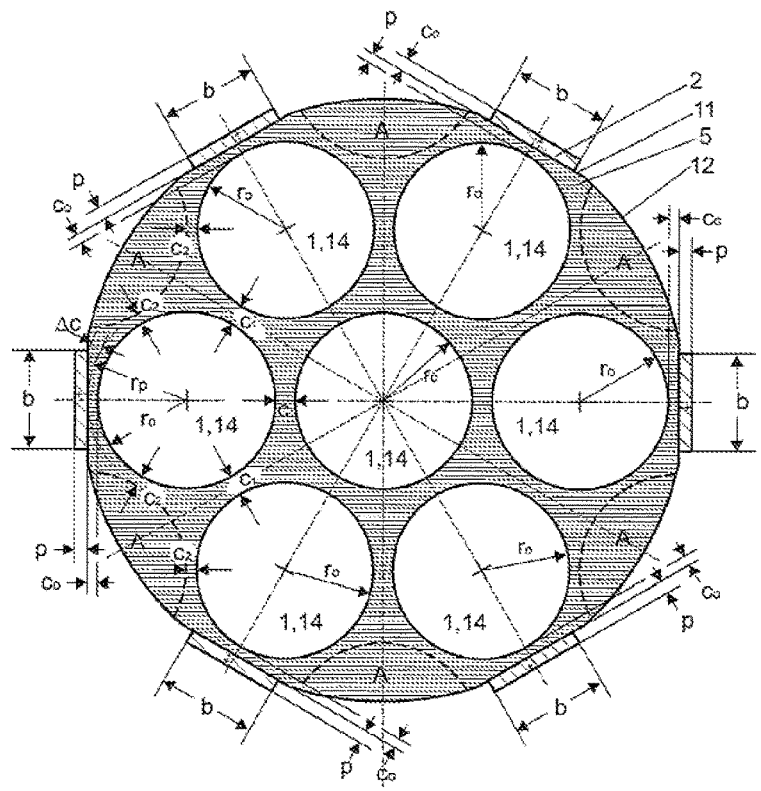
FIG. 7A shows an array of a plurality of vessels of a device according to the invention in an eighth embodiment.

FIG. 7A illustrates another way of increasing the total flow area by acoustically coupling multiple circular-cylindrical acoustic volumes drilled side-by-side in a common block. In other words, multiple vessels have a common shell that has a common outside wall 12. This results in an array of vessels 5, with six vessels 1 being evenly distributed in cross-section around a central vessel 1, thus being at an angle of 60° to their adjacent vessels 1. The outside wall 12 has connection surfaces 11 on which the oscillation elements 2 are arranged, with the connection surfaces being equally evenly arranged around the central vessel 1, corresponding to the vessels 1. All vessels 1 have the same inner radius $r_0$ and thus the same interior 14, and all oscillation elements 2 have the same dimensions. Optimal acoustic coupling is achieved when the equivalent wall thickness $c_1+2\cdot\Delta c/3$ between two adjacent vessels 2 corresponds to an integral multiple of half a wavelength, i.e. preferably corresponds approximately to the relation $c_1+2\cdot\Delta c/3 = n\cdot v_C/(2f)$.

In contrast, it is preferred that the outside wall 12 bounding the vessel array to the outside be as acoustically opaque as possible. This can be achieved, for example, by removing unnecessary volumes (such as the regions marked "A" in FIG. 7A) from the overall vessel wall, and the remaining equivalent wall thickness (e.g., in the case shown, $c_2+2\cdot\Delta c/3$) corresponds to an odd multiple of a quarter wavelength, i.e., $c_2+2\cdot\Delta c/3 = (2n-1)\cdot v_C/(4f)$. All other characteristic dimensions (b, p, and $c_o$) preferably correspond to the case already discussed for FIG. 3A to 3C.

Figure 7B:
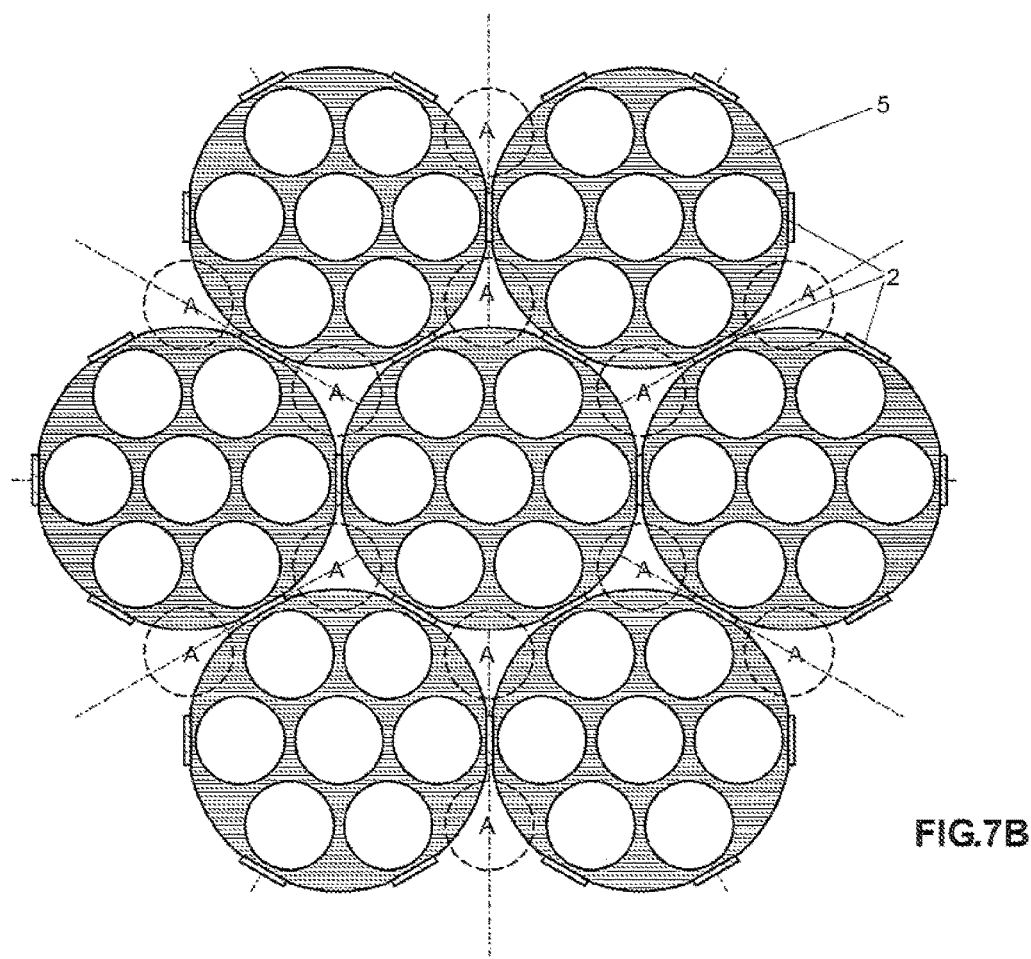
FIG. 7B shows an array of a plurality of vessels of a device according to the invention in a ninth embodiment.

FIG. 7B illustrates one of the possible acoustic couplings of several vessel arrays 5, as for example in FIG. 7A, as a possibility of further enlarging the flow cross-section and furthermore of distributing the acoustic energy as evenly as possible when operating on a common electrical alternating signal. In this case, corresponding to FIG. 6C, the oscillation elements 2 are acoustically connected to two vessel arrays 5 each, whereby a honeycomb-like structure is created.

Figure 8A:
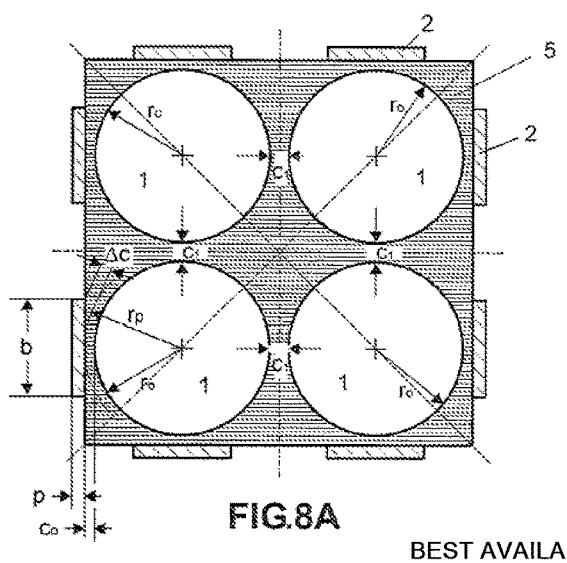
FIGS. 8A to 8E show arrays of a plurality of vessels of devices according to the invention in various further embodiments.
Figure 8B:
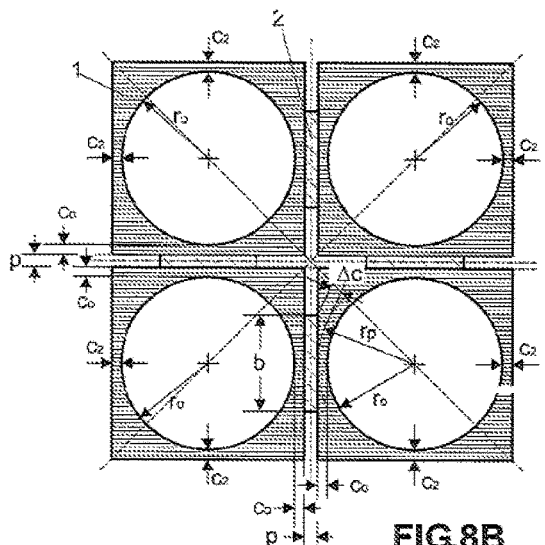
Figure 8C:
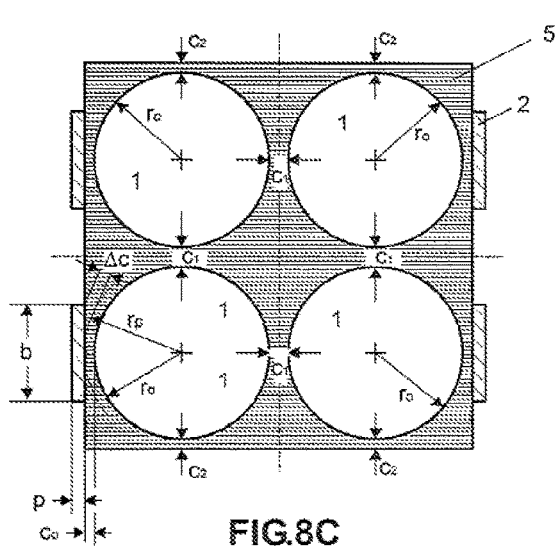
Figure 8D:
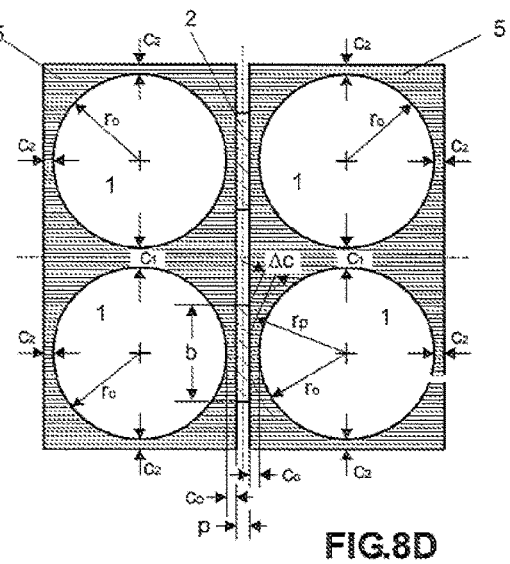
Figure 8E:
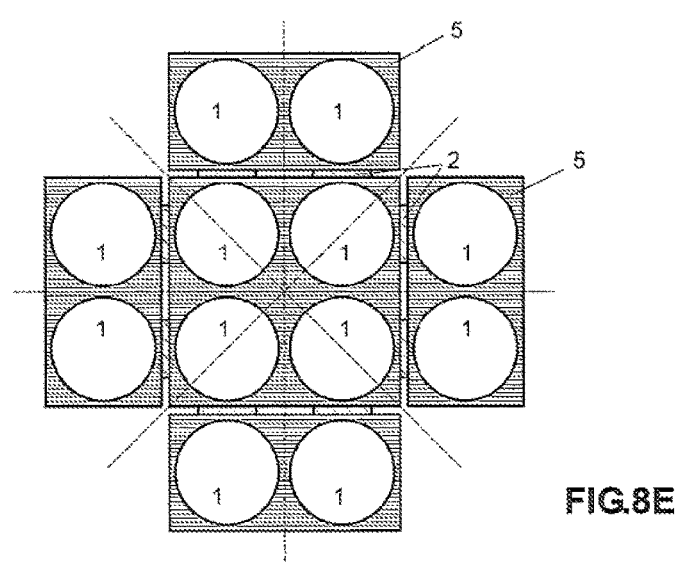

FIGS. 8A-8E illustrate further of the many possibilities for acoustically coupling a plurality of acoustic cylinders according to the invention to increase flow cross-section and uniform acoustic energy distribution when operating from a common alternating electrical signal. Again, the same criteria as discussed earlier preferably apply to the characteristic dimensions b, p, $c_o$, $c_1$, $c_2$. FIG. 8A shows an embodiment of a composite vessel 5 with oscillation elements 2 arranged uniformly on the outside wall 12, while the embodiment of FIG. 8C has only two oscillation elements 2 on each of two sides, each of which is associated with a vessel 1. It should be emphasized that either vessels 1 may be coupled to individual shells via the oscillation elements 2, see for example FIG. 8B. On the other hand, vessel arrays 5 can also be coupled to each other via oscillation elements 2, see FIG. 8D and FIG. 8E.

Figure 9A:
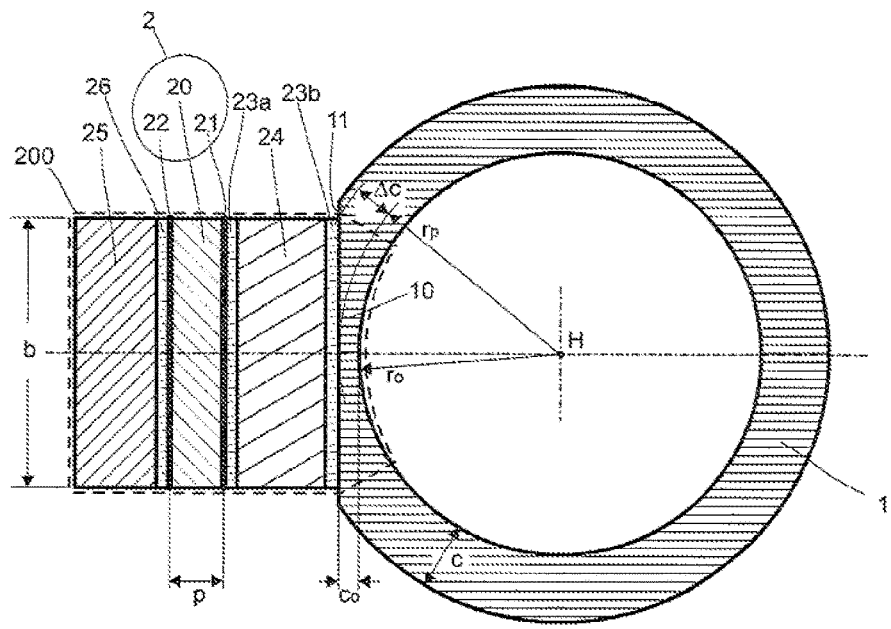
FIG. 9A shows a vessel of a device according to the invention in a tenth embodiment having only one oscillation element in cross-section.

FIG. 9A illustrates a general structure of a transducer array 200 formed by the oscillation element 2 and the vessel wall section 10, as well as further acoustically coupled layers 23a, 23b, 24, 25, 26, wherein one or more coupling layers 23a, 23b, 24 may be arranged between the side 21 facing the vessel of the oscillation element 2 essentially consisting of a piezoelectric plate 20 and the vessel wall section 10. These coupling layers 23a, 23b, 24 may be necessary, for example, in order to fix the oscillation element 2 to a stationary support plate 24 by means of an adhesive layer 23a instead of permanently bonding it directly to the vessel wall 10, in order to be able to acoustically couple the vessel 1 to the oscillation element 2 via this support plate 24 for only temporary use (for example, with a gel layer 23b serving as a bonding layer and applied to the support plate 24). This makes it possible, for example, to be able to manufacture the vessel 1 from plastic materials for single use, but to provide the oscillation element 2 for frequent use. In this regard, the bonding layers 23a, and/or 23b may be so thin as to be negligible.

Similarly, one or more outer layers 25, 26 may be arranged on the side 22 of the oscillation element 2 facing away from the vessel 1 in the thickness direction of the oscillation element 2. This can serve, for example, to apply a counter-mass 25 to the oscillation element 2 outwardly via a connecting layer 26 for reasons of acoustic symmetry. However, the outer layers 25, 26 can also serve, for example, to electrically and/or acoustically insulate the oscillation element 2 outwardly from a surrounding cooling liquid. The outer layers 25, 26 can thereby represent insulating layers 25 on the one hand and connecting layers 26, (for example made of adhesive) on the other hand. The connecting layers may be so thin as to be negligible. The outer layers 25, 26 are acoustically coupled layers of the transducer array 200.

Analogous to the trivial case illustrated in FIG. 3C, according to the invention the acoustically coupled layers 2, 10, 23a, 23b, 24, 25, 26 of a multilayer transducer array 200 illustrated as in FIG. 9A have thicknesses such that none of the natural resonances of the transducer array lies in the vicinity of the desired operating frequency f, and preferably occupy as large a frequency spacing as possible from the desired operating frequency f, thus the thicknesses of the layers come as close as possible to the condition $$2f \cdot (c_{equ}/v_c + p/v_P + d_1/v_{d1} + d_2/v_{d2} + \ldots + d_i/v_{di}) = 1/2 + n$$

$$n = \{0, 1, 2, 3, \ldots\},$$

wherein $v_c$ is furthermore the sound velocity in the vessel wall section 10 in the region of the oscillation element 2 and $v_p$ is the sound velocity in the thickness direction in the oscillation element 2, while $d_1$ to $d_i$ are the thicknesses and $v_{d1}$ to $v_{di}$ are the sound velocities of further layers 23a, 23b, 24, 25, 26 of the transducer array 200 acoustically coupled in the thickness direction, and the index number "i" is a natural number which indicates the number of these further layers 23a, 23b, 24, 25, 26 of the transducer array.

Furthermore, in a preferred embodiment, the thicknesses of the one or more outer layers 25, 26 coupled to the side 22 of the oscillation element 2 facing away from the vessel satisfy, as far as possible, in themselves the condition $$2f(d''_1/v_{d''_1} + d''_2/v_{d''_2} + \ldots + d''_k/v_{d''_k}) = s \ \ s = \{0, 1, 2, 3, \ldots\},$$

which is equivalent to the condition that, if possible, an integer half-wave number falls on the total thickness of these outer layers 25, wherein $d''_1$ to $d''_k$ are the thicknesses and $v_{d''_1}$ to $v_{d''_k}$ are the sound velocities of these outer layers 25, 26, and the index number "k" is a natural number indicating the number of these outer layers.

For the normally practical case where a piezoelectric plate is used as the oscillation element 2 for excitation at your thickness mode fundamental frequency (i.e., the oscillation element has a thickness $p=v_p/(2f)$), two latter conditions can also be expressed as $$(c_{equ}/v_c + p/v_P + d_1/v_{d1} + d_2/v_{d2} + \ldots + d_i/v_{di}) =$$
$$p/v_P \cdot (1/2 + n \pm \Delta n),$$
$$\text{and } (d''_1/v_{d''_1} + d''_2/v_{d''_2} + \ldots + d''_k/v_{d''_k}) = p/v_P \cdot (s \pm \Delta s),$$

where n={0, 1, 2, 3, . . . } and s={0, 1, 2, 3, . . . }, wherein the tolerance values $\Delta n$ and $\Delta s$ are each at least less than 0.3, preferably 0.2, and particularly preferably less than 0.1.

The width b of the oscillation element 2 preferably corresponds to the case already discussed for FIGS. 3A to 3C.

Figure 9B:
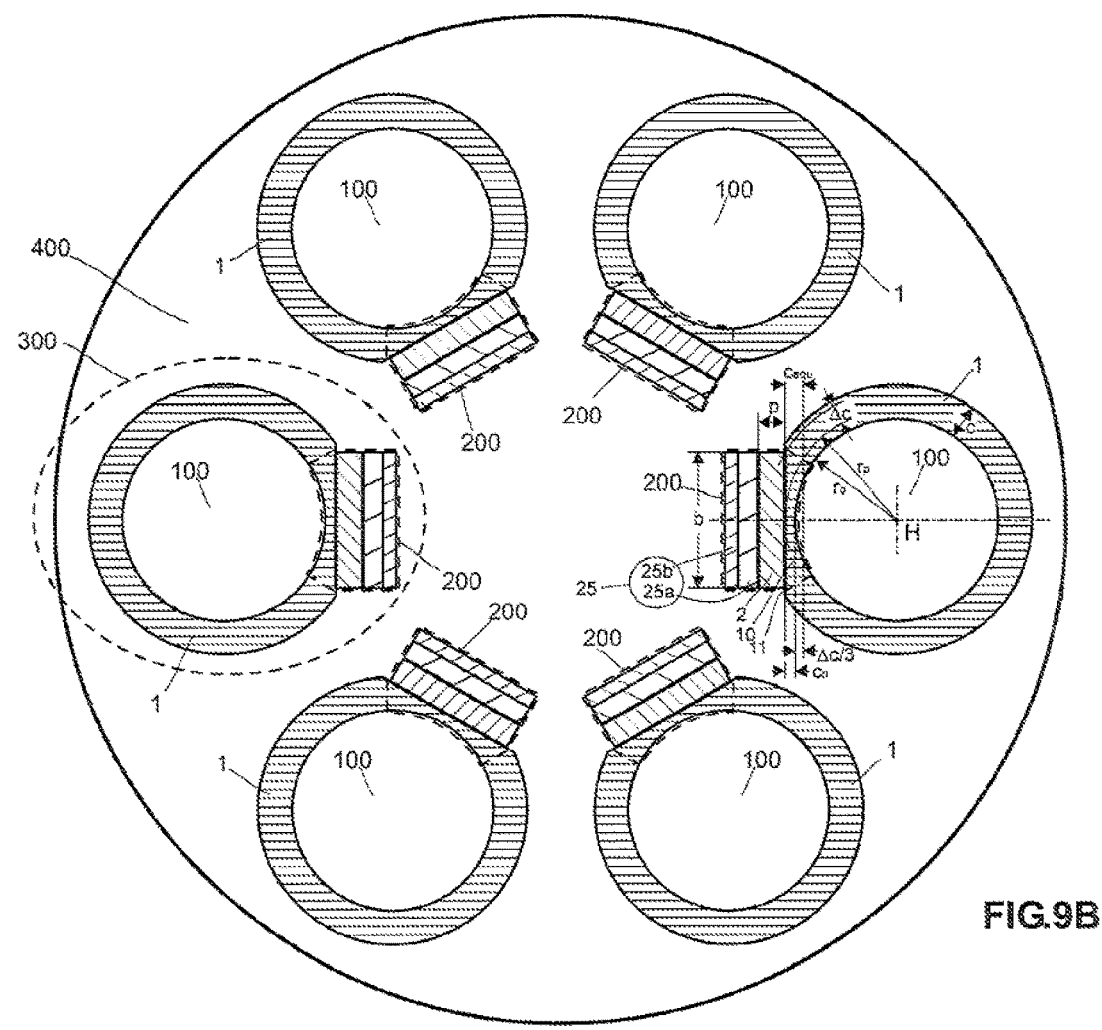
FIG. 9B shows an array of a plurality of vessels according to FIG. 9A of a device according to the invention in an eleventh embodiment.

FIG. 9B shows a possible embodiment variant according to the invention, in which several identically constructed tubular vessels 1 with transducer array 200 are arranged in parallel and surrounded by a common cooling medium 400. In this case, a transducer array 200 has, in addition to the vessel wall section 10 and the oscillation element 2, two further layers 25a and 25b which are acoustically connected (via coupling layers of negligible thickness) to the side of the oscillation element facing away from the vessel wall. In this regard, the material of these two outer layers 25a and 25b is selected such that the layer 25a located between the outermost layer 25b and the oscillation element 2 has a significantly lower acoustic impedance than the oscillation element 2 and the outermost layer 25b. This provides an acoustic isolation effect that minimizes unwanted transmission of acoustic energy into the surrounding medium 400. Preferably, the two outer layers 25a and 25b each have thicknesses corresponding to an odd multiple of a quarter wavelength at the desired operating frequency f.

Figure 10A:
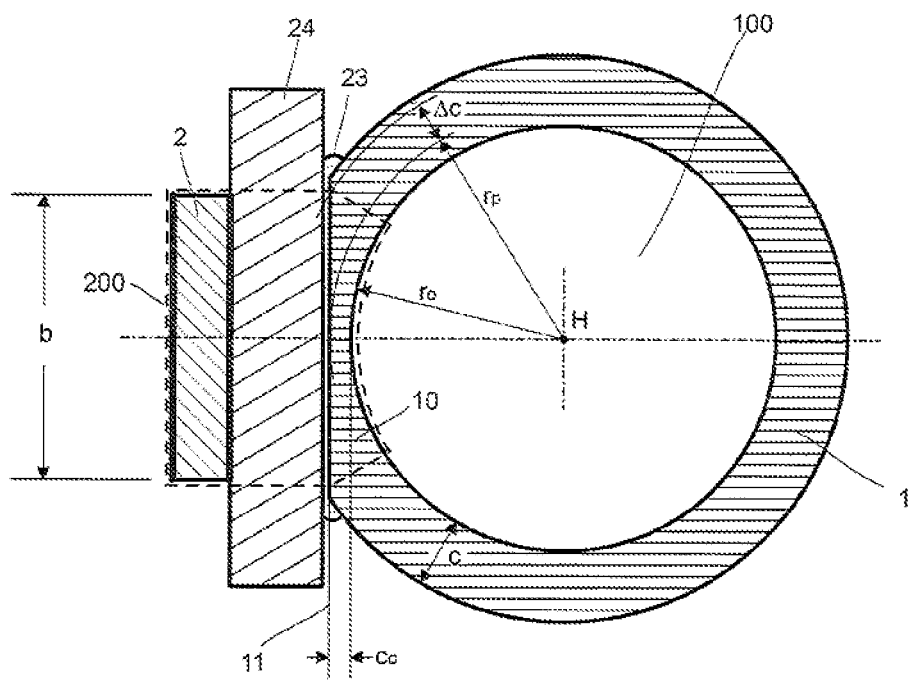
FIG. 10A shows a vessel of a device according to the invention in a twelfth embodiment having only one oscillation element in cross-section.

FIG. 10A shows a possible embodiment variant according to the invention, in which the transducer array 200 comprises the vessel wall section 10, the oscillation element 2, an intermediate support plate 24, a negligible (therefore not shown) thin adhesive layer between the oscillation element 2 and the support plate 24, and a temporarily applied coupling layer 23 between the support plate 24 and the vessel wall section 10. This embodiment allows the vessel 1 to be acoustically coupled to the support plate 24 (for example with an acoustically transparent gel 23) only temporarily for operation. This may be useful, for example, if the vessel is intended for one-time use only, but the oscillation element is designed for frequent operation.

In this case, the vessel wall section 10, the coupling layer 23, the support plate 24, and the oscillation element 2 each have thicknesses according to the invention, which satisfy the criteria already discussed with respect to FIG. 9A. The width b of the oscillation element 2 and the wall thickness c of the vessel 1 preferably correspond to the case already discussed for FIGS. 3A to 3C.

Figure 10B:
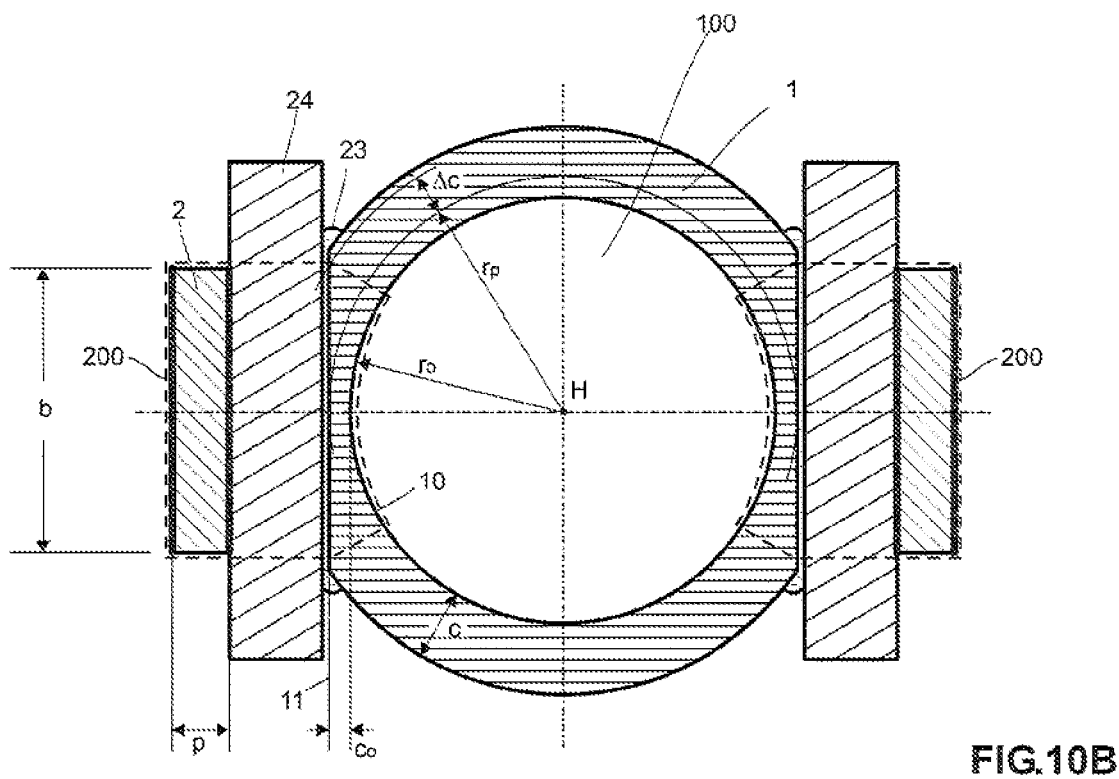
FIG. 10B shows a vessel of a device according to the invention in a thirteenth embodiment having two opposing oscillation elements in cross-section.

FIG. 10B shows a further possible embodiment variant according to the invention as a two-sided variant of the device presented in FIG. 10A, with transducer arrays 200 arranged in mirror symmetry around a detachable vessel 1. This two-sided variant of FIG. 10A is particularly useful when the detachable (disposable) vessel is made of a material (e.g., plastic) that significantly dampens acoustics, and therefore a single-sided input of acoustic oscillations only cannot sufficiently ensure symmetry of incoming and reflected waves to produce an effective standing wave field within the dispersion 100. All characteristic dimensions (b, p, $c_o$ and c) preferably correspond to the case already discussed for FIG. 10A.

FIGS. 11A-11D illustrate some of the numerous ways in which devices according to the invention can be implemented in practical use.

Figure 11A:
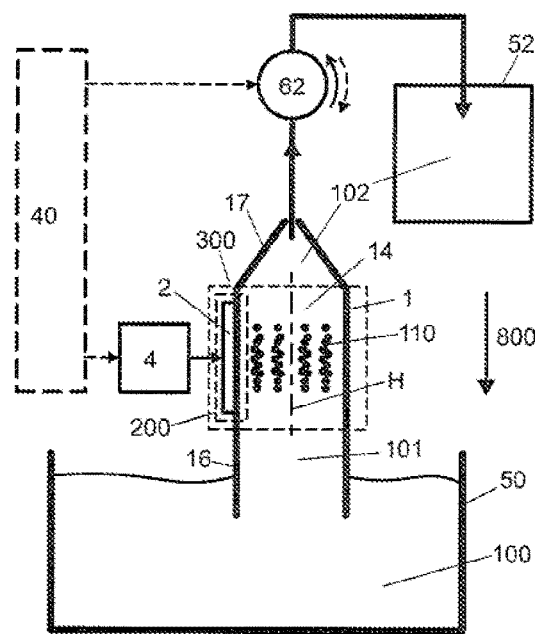
FIGS. 11A-11D show schematic views of various implementations with devices according to the invention in a further embodiment.

FIG. 11A illustrates a simple way of implementing a device according to the invention for separating dispersion medium from a dispersion 100, wherein the dispersed particles have a higher specific gravity than the medium of the dispersion 100, such as is the case with biological cells dispersed in a nutrient medium.

In the illustrated arrangement, the vessel 1 forms a transducer array 200 with the oscillation element 2. The transducer array 200, the opposing acoustically reflective wall of the vessel 1, and the dispersion 100 located in the interior 14 of the vessel form an acoustic system 300. The influence region 16 of the vessel 2 located directly below the acoustic system 300 is immersed directly in the dispersion 100 without any further pipe or hose routing. A pump 62 is connected to the outflow region 17 of the vessel 1 located above the acoustic system 300. When the pump 62 is operated in the forward direction, dispersion 100 is drawn from the vessel 50 into the acoustic system 300 substantially against the force of gravity 800. The signal generator 4 is electrically connected to the oscillation element 2 and excites a standing ultrasonic field with frequency f in the acoustic system 300. This results in immobilization and compaction of the dispersed particles in the region of the sonic bulges 110, and possibly also in the formation of particle aggregates.

At the level of the transducer array 200, the vessel 1 has no significant change in the cross-section of influence with respect to its region of influence 16, so that particle compacts 110 caused by the acoustic field can sediment directly back into the container 50 under the influence of gravity 800 without being hindered by any constrictions in the region of influence 16 of the vessel 1, as soon as the regions of the particle compacts 110 (or, optionally, of the particle aggregates 110) have reached a size (or weight) which allows them to overcome the acoustic forces (and, optionally, the hydrodynamic entrainment forces of the dispersion 100 flowing into the vessel 1).

Precipitation of particle compacts 110 from the acoustic field by gravity 800 may additionally be assisted by periodic shutdown of the signal generator 4 by a timer or central process control unit 40, during which time the ultrasonic field may additionally be interrupted, the pump 62 may also be stopped or operated in reverse, so that areas of dispersion 101 with accumulated higher particle concentration are more effectively flushed back into the container 50 in and below the acoustic system 300.

Figure 11B:
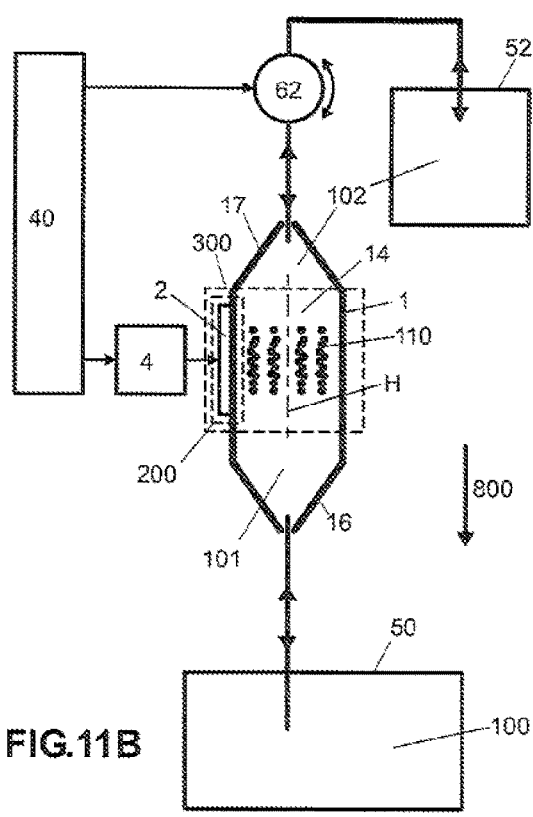

In contrast to FIG. 11A, the exemplary arrangement illustrated in FIG. 11B has a narrowed inflow orifice 16 which allows, for example, the use of a pipe or hose line between vessel 1 and dispersion container 50 to operate the acoustic system 300 at a greater distance from the dispersion container 50. In this regard, the optional periodic shutdown of the signal generator 4 described for FIG. 11A, synchronized with the reversal of the pump 62, becomes a necessary process step to be provided, for example by a process control unit 40, to flush the concentrated dispersion 101 back into the dispersion vessel.

Figure 11C:
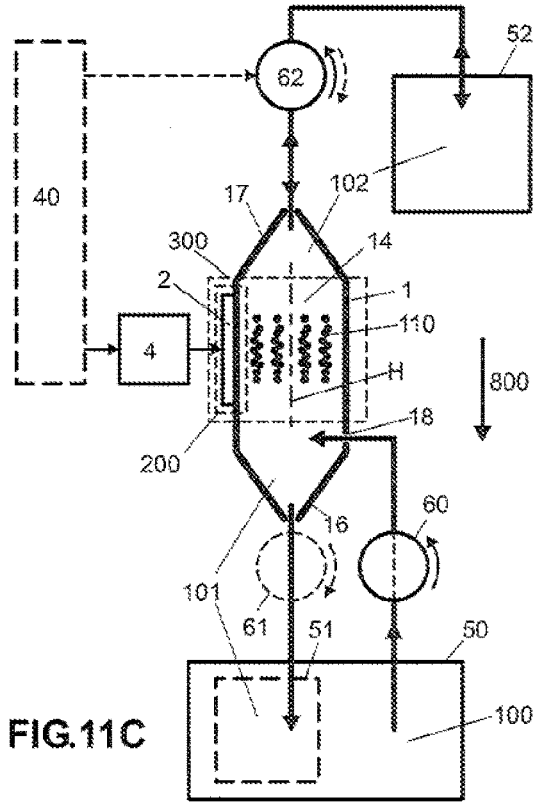

FIG. 11C illustrates a typical extension of the embodiment variant shown in FIG. 11B, in which the vessel 1 provides, in addition to the lower and upper inflow/outflow regions 16 and 17, a lateral inflow port 18 disposed substantially below the acoustic system 300 and above the lower port 16. A pump 60 transports dispersion 100 from the vessel 50 through the lateral inflow port 18 and into the vessel 1, wherein the flow rate of the pump 60 is selected to be less than the delivery line of the pump 62, thereby allowing continuous effective removal of particulate enriched dispersion 101 back into the dispersion vessel 50 via the lower outflow region 16.

Optionally, precipitation of particle compacts 110 retained in the acoustic field may be further promoted by periodically shutting down the signal generator 4, possibly also upon synchronized reversal of the pump 62 (as already optionally presented in FIG. 11A). Further optionally, it may be provided that the particle concentrate 101 is not returned to the original dispersion vessel 50 (as is, for example, useful for the application of cell retention in a bioreactor), but is collected in a separate vessel 51 (as is, for example, useful when the recovery of a particle concentrate 101, and not, or not only, the recovery of the purified medium 102 is of interest). By way of example, the application of bioreactor "harvesting" is mentioned, in which, after completion of a cell culture run, as many cells (also referred to as "biomass") as possible must be separated from the entire contents (i.e., from the entire cell suspension 100) of a bioreactor serving as a dispersion vessel 50, in order to feed the medium 102 freed from biomass to the further biotechnological downstream process. Returning the already separated cell concentrate 101 to the bioreactor, and thus remixing it with the cell suspension 100 still to be processed, would of course be impractical.

Especially if it is important to achieve a dispersion 101 of as high as possible, (or precisely defined) particle concentration at the lower outflow orifice 16, it may be useful to use a pump 61 between the lower outflow orifice 16 and its own collection container 51 for the concentrate instead of the pump 60 in the circuit of the lateral inflow 18 (or alternatively instead of the pump 62 at the upper outflow orifice 17). In this way, the flow rate (and hence the particle concentration) of the concentrate 101 withdrawn therefrom is not dependent on the difference between the flow rates of the pumps 60 and 62, but is determined by the directly definable flow rate of the pump 61 (which is more accurate especially for smaller flow rates). If, for example, a certain quantity of biological cells is to be withdrawn from a bioreactor 50 in a controlled manner (e.g. in order not to allow the concentration of the cell suspension 100 in the dispersion container 50 to rise above a certain limit), it is particularly important to lose as little medium as possible, and therefore to achieve as highly concentrated a cell suspension 101 as possible in the collection container 51 by means of a precisely defined delivery rate at the orifice of the lower discharge region 16, for which purpose the use of the pump 61 at this orifice is particularly advantageous.

Figure 11D:
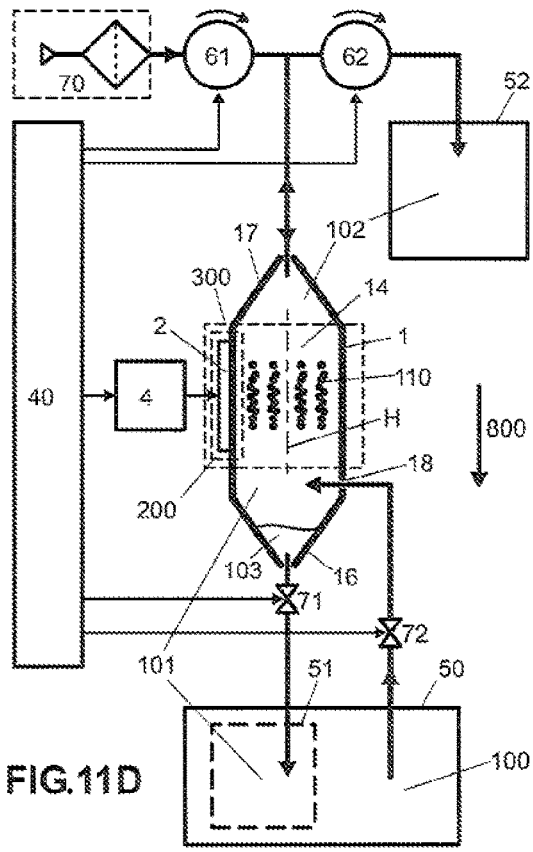

FIG. 11D illustrates an alternative arrangement with (as already presented in FIG. 11C) lateral inflow 18. However, in this arrangement variant, the lateral pump 60 shown in FIG. 11C is dispensed with, and instead a valve 72 is provided in the inflow line between dispersion container 50 and vessel 1. Furthermore, a valve 51 is also provided in the discharge line between the lower discharge area 16 and the dispersion vessel 50 (or alternatively the separate collection vessel 51 for the concentrate). Furthermore, in addition to the pump 62 which conveys the filtrate 102 from the upper orifice region 17 of the vessel 1 into the filtrate collection container 52, a further pump 61 is provided which, when activated, flushes liquid or gaseous, flushing medium suitable for the particular application from a flushing source 70 (possibly also via a separate port not shown) into the upper orifice region 17. By suitable control of the pumps 61 and 62, the valves 71 and 72, as well as the signal generator 4, the following operative states can thus be achieved via a control unit 40:

Forward mode: Pump 61 off, valve 71 closed
   Pump 62 on, valve 72 open
   Signal generator 4 activated
Backwash mode: Pump 61 on, valve 71 open
   Pump 62 off, valve 72 closed
   Signal generator 4 deactivated In the forward mode, the dispersion 100 flows from the vessel 1 to the acoustic system 300 via the lateral port 18. The particle regions 110 compacted by the ultrasonic field precipitate as a particle concentrate 101 into the lower port region 16, wherein a particle concentrate 101 and possibly also at least partially a particle sediment 103 may be formed.

In the backwash mode, the formed particulate concentrate 101 is flushed into the dispersion container 50, or alternatively into a dedicated collection container 51, together with any sediment 103 that may also have formed.

The particular advantage of the device presented in FIG. 11D is that it avoids pumping of the particle-laden dispersion 100, 101, since pump 62 conveys only the dispersion stream 102 cleaned of particles. This is particularly advantageous in biotechnological applications, since pumping cell culture suspensions can cause damage to the suspended living cells.

All devices according to FIGS. 11A-11D, but of course not limited only to the possible forms of implementation of the device according to the invention shown in these figures, may of course also comprise several oscillation elements 2 and transducer arrays 200. These can both be arranged at substantially the same height of the vessel 1 and thus be part of a common acoustic system 300 excited by the same signal generator 4, and also be arranged at different heights of the vessel 1 and thus be part of their own acoustic systems, and then possibly also excited by different signal generators at different frequencies.

Depending on the particular application, a variety of other configurations of pumps, valves and possible additional (optionally widening or tapering) inlet and outlet ports around the acoustic system are of course possible in addition to the arrangements shown in FIGS. 11A-11D. This includes, by way of example, identical or similar arrangements as described with the figures of WO 2017/063080 A1, and of course other alternative configurations known or readily derivable from those previously mentioned and from other sources.

Further, the orientation of the exemplary devices of FIGS. 11A to 11D with respect to the direction of gravity 800 is such as to enable retention or separation of dispersed particles having a higher specific gravity than the medium of dispersion 100. It is obviously possible to arrange these and similar devices rotated 180 degrees with respect to gravity to enable retention or separation of dispersed particles having a lower specific gravity than the medium of dispersion 100, which is apparent to the average person skilled in the art of separation by sedimentation or flotation and is hereby anticipated.

Figure 12:
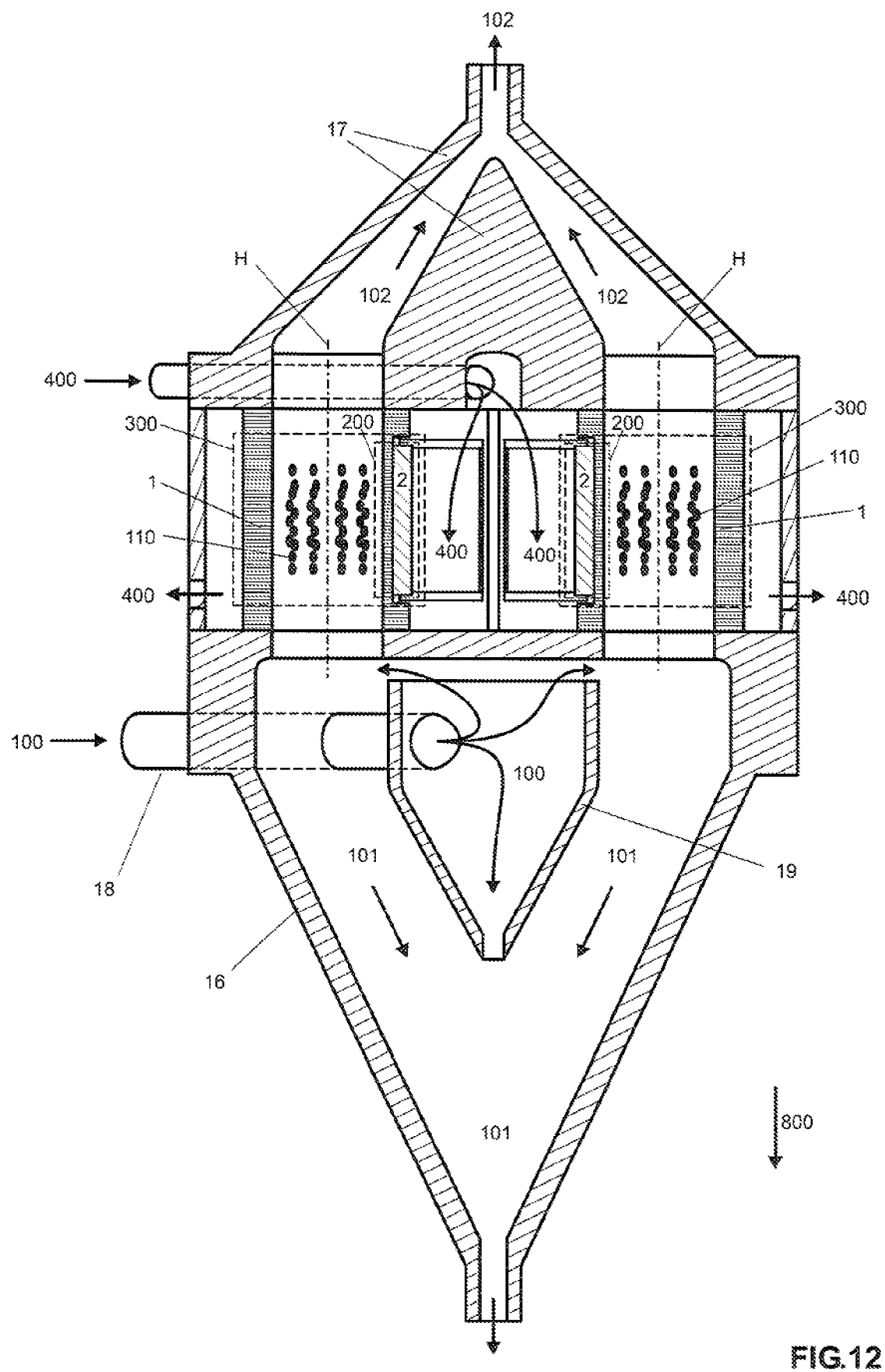
FIG. 12 shows a device according to the invention in one embodiment having two vessels in a sectional view.

FIG. 12 is an exemplary detailed illustration as a longitudinal section of a device according to the invention, such as may be used in the arrangements described in FIGS. 11C and 11D.

A possible cross-section of the device presented in FIG. 12 has already been substantially presented in FIG. 9B. Accordingly, the device consists of six similar acoustic systems 300 according to the invention and operated in parallel at the same height, each of them comprising at least one vessel 1 formed as a circular-cylindrical tube and an oscillation element 2. According to the invention, each oscillation element 2 forms with the vessel wall section located in its region (and possibly further layers having an acoustically and electrically insulating effect with respect to a possible cooling medium 400) an identical transducer array 200, so that (if desired) all 6 parallel acoustic systems 300 can also be excited by a common signal generator with the same frequency.

According to FIG. 12, the dispersion 100 flows into the device through the lateral inflow port 18 and is distributed as uniformly as possible in all directions of the common lower orifice region 16 of the device, which is designed as a sedimentation funnel, by an influence distributor 19 designed here as a circular-cylindrical funnel. In the acoustic standing wave fields of the interiors of the respective vessel tubes 1 of all six acoustic systems 300 (in FIG. 12 two of these six acoustic systems 300 are visible in cross-section), which are arranged above the inflow distributor 19 and are circular-cylindrical in design according to the invention, the regions 110 compacted with particles occur, which can subsequently be removed as dispersion concentrate 101 at the lowest point of the orifice area 16 of the device. At the same time, the dispersion medium 102 cleaned of particles can be removed from the device via a common upper outflow region 17.

Figure 13A:
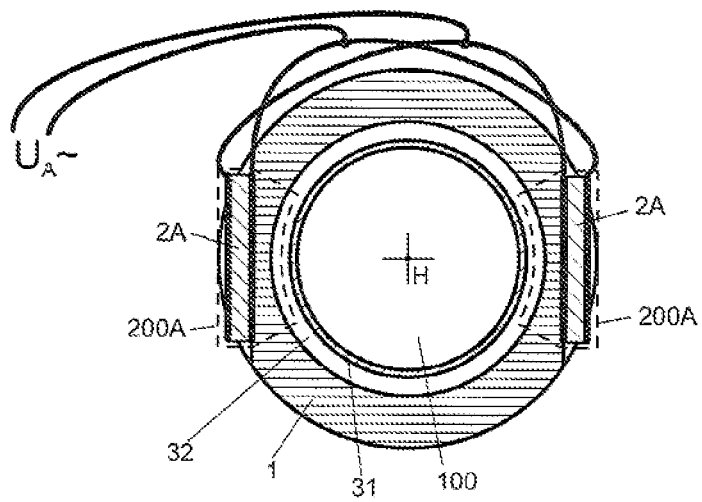
FIG. 13A shows a device according to the invention in one embodiment with inserted sample container in a cross-section.
Figure 13B:
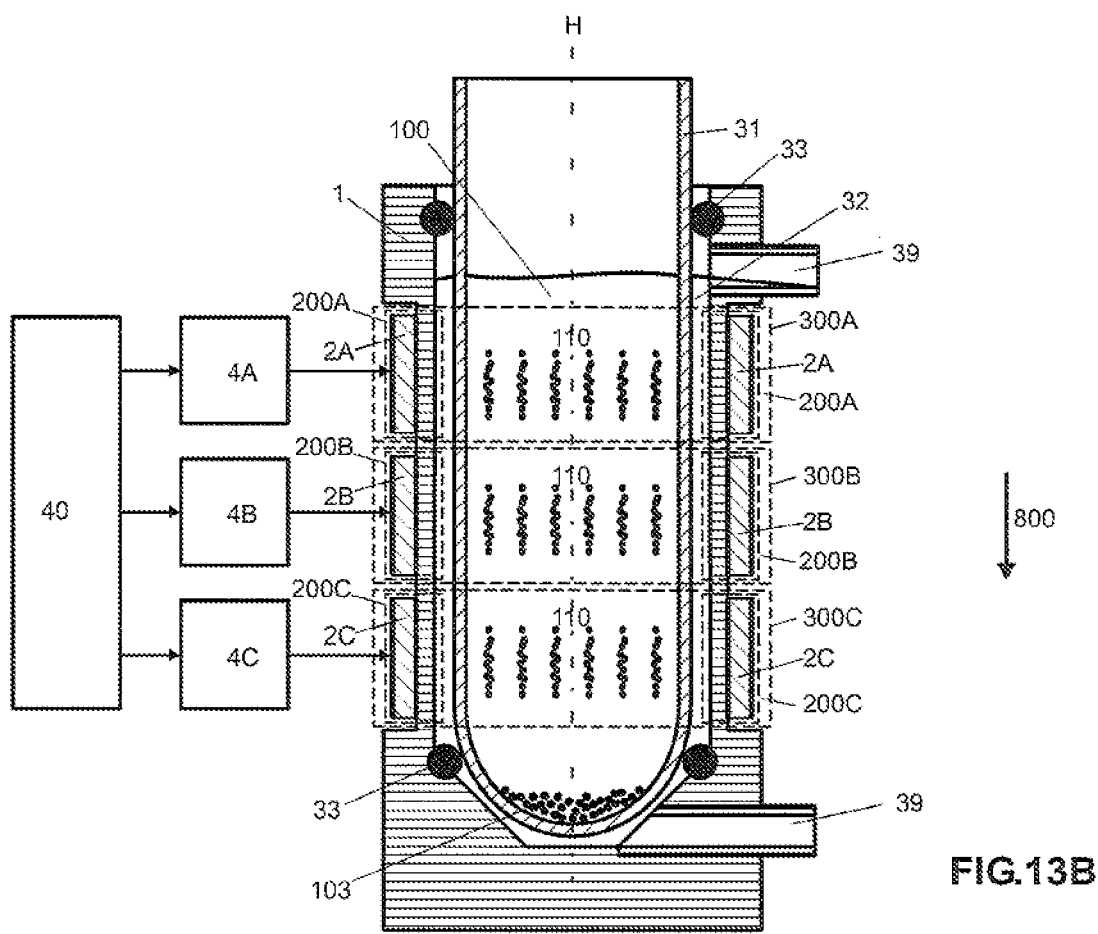
FIG. 13B shows a longitudinal section of the embodiment of FIG. 13A.

FIGS. 13A and 13B show transverse and longitudinal sections of a further device according to the invention for separating dispersed particles by sedimentation 103 from a dispersion 100 present in a sample container 31 (or by flotation, if the specific gravity of the dispersed particles is less than that of the dispersion medium). In this case, the sample container 31 is introduced into the interior of the vessel 1, which is essentially circular-cylindrical in accordance with the invention, as coaxially as possible with the main axis H of the interior, wherein the sample container 31 preferably also has a circular-cylindrical shape. Spacers 33, in the embodiment shown or in another expedient embodiment, may be provided to ensure as constant as possible an intermediate space 32 between the sample container 31 and the inner wall of the vessel 1. The intermediate space 32 itself is filled with an acoustically transparent liquid or gel to provide acoustic coupling between the sample container 31 and the inner wall of the vessel 1. Inlets and outlets 39 of this or other convenient design may be provided to ensure a level of liquid in the intermediate space 32 at least as high as the area of dispersion 100 to be sonicated in the sample container 31.

The embodiment shown in FIG. 13B provides three acoustic systems 300A, 300B, and 300C arranged one above the other, each of which is typically delimited by two transducer arrays 200A-200A, 200B-200B, and 200C-200C (which are symmetrically opposite one another with respect to the main axis H of the interior of the vessel 1), and further comprising the respective intermediate sections of the liquid or gel in the intermediate space 32 and the wall of the sample container 31, as well as the respective section of the dispersion 100 at the level of the respective acoustic system. According to the invention, the transducer arrays 200A, 200B, and 200C are respectively formed by the oscillation elements 2A, 2B, 2C and by the respective sections of the wall of the vessel 1 in the region of the respective oscillation elements.

In the illustrated case, the three acoustic systems 300A, 300B, and 300C are each driven by a signal generator 4A, 4B, 4C with a respective alternating electrical signal $U_A\sim$, $U_B\sim$, $U_C\sim$. The wall thickness of the sample container 31 with respect to the three frequencies of these signals (and vice versa) is preferably provided to correspond to approximately an integer multiple of half a wavelength in the wall of the sample container 31 for each of these three frequencies, so as to provide uniform acoustic transparency through the wall of the sample container 31. This is especially true for sample containers 31 made of glass or acoustically even harder material, such as metals. On the other hand, in the case where the sample container 31 is made of plastic (such as for the purpose of single use) or another acoustically absorbent material, the wall of the sample container 31 should preferably be made thin enough to just ensure sufficient mechanical stability. In this case, the condition according to a wall thickness of the sample container 31 of half a wavelength is secondary. A suitable wall thickness of a sample container 31 made of plastic is typically in the range of 1 mm or less.

In the case shown in FIG. 13B, all signal generators 4A, 4B, 4C are activated and deactivated by a central control unit. In this case, the such individual activation/deactivation of ultrasonic fields in the acoustic systems 300A, 300B, and 300C (as one of many alternatives) can be provided, for example, in a periodically recurring sequence A-B-C-A-B-C-... so that first a standing wave field is formed in the highest acoustic system 300A and areas of particle compaction and/or particle aggregates 110 are formed there first, which can then be lowered in a controlled manner by subsequent activation of the lower-lying ultrasonic field in acoustic system B (when system A is switched off), and then C (when B is switched off), so that finally, after deactivation of system C, a particularly dense sediment 103 is formed at the bottom of the sample container 31.

The sequential activation/deactivation of the acoustic regions A-B-C described by way of example can be optimized, for example, by also providing periods of simultaneous activation of two or all three regions, or generally simultaneous activation of the regions A, B, C with temporally staggered deactivation; or by any other appropriate combination of activated/deactivated states of the acoustic systems 300A, 300B, 300C that optimizes such accelerated sedimentation of dispersed particles with such minimized resuspension of precipitating particle compacts and/or particle aggregates 110.

Alternatively, instead of having three acoustic systems 300A, 300B, 300C, a device according to the invention as shown in FIGS. 13A and B may have only two, one, or more than three acoustic systems.

Alternatively, a control system 40 may be omitted and the ultrasonic field in the one or more acoustic systems may be activated for a fixed duration.

Further, the particles dispersed in the dispersion 100 may have a lower specific gravity than the dispersion medium of the dispersion 100, in which case sedimentation 103 of the particles to the bottom of the sample container 31 does not occur, but instead the particles are precipitated to the surface by flotation against gravity 800.

The invention claimed is:

1. A device for producing a standing ultrasonic field at a frequency f in a liquid, the device comprising:
   a substantially dimensionally stable vessel including an outside wall and a substantially circular-cylindrical interior, the vessel configured and arranged for receiving the liquid and the at least one oscillation element;
   a transducer array including at least one oscillation element and a vessel wall section of the vessel in the region of the at least one oscillation element, wherein the transducer array further includes at least one layer including the vessel wall section of the vessel in the region of the at least one oscillation element;
   wherein the at least one oscillation element is acoustically connected to the outside wall of the vessel and configured and arranged to be excitable at the frequency f,
   wherein the substantially circular-cylindrical interior is configured and arranged for receiving the liquid with an inner radius $r_o$ at least in the region of the oscillation element; and
wherein the oscillation element has a mean thickness p and a width b in the direction orthogonal to a main axis of the interior, and the width b is not greater than the inner diameter $2r_o$, the oscillation element has at least one substantially flat lateral surface, and in that the oscillation element is acoustically connected via this one flat lateral surface to a substantially flat connection surface of the outside wall of the vessel in the region of the circular-cylindrical interior, wherein the connection surface is arranged parallel both to the main axis of the circular-cylindrical interior and to the oscillation element, wherein the width b of the oscillation element is in the range between $(r_P \cdot p \cdot v_C/v_P)^{1/2}$ and $4 \cdot (r_P \cdot p \cdot v_C/v_P)^{1/2}$,
wherein $r_P = r_o + c_o$ applies, $r_o$ is the inner radius of the interior, $c_o$ is the minimum wall thickness of the vessel wall section in the region of the oscillation element, and wherein $v_C$ is the sound velocity in the vessel wall section, and where $v_P$ is the sound velocity in the thickness direction in the oscillation element,
   wherein the thicknesses of the at least one layer of the transducer array is selected such that natural resonance frequencies $f_{er}$ of the transducer array to the desired frequency f of the ultrasonic field have distances which are greater than one fifth of the distance $f_{er,1} - f_{er,2}$, wherein $f_{er,1}$ and $f_{er,2}$ are the two closest natural resonance frequencies $f_{er}$ with respect to the frequency f.

2. The device according to claim 1, wherein the outside wall of the vessel has a substantially circular-cylindrical shape in the region of the circular-cylindrical interior apart from the connection surface.

3. The device according to claim 1, wherein the width b of the oscillation element is less than or equal to $3(r_P \cdot v_C/f)^{1/2}$.

4. The device according to claim 1, wherein the transducer array includes a layer or a plurality of layers acoustically coupled in the thicknesses direction of the oscillation element, and characterized in that the thickness of the layers of the transducer array are selected such that the half-wave number k of the transducer array satisfies the condition $$\kappa = 1/2 + n \pm \Delta n$$

wherein n is a natural number, and the tolerance value $\Delta n$ is at least less than 0.3, and
the half-wave number k of the transducer array is substantially given by $$\kappa = 2f \cdot (c_{equ}/v_C + p/v_P + d_1/v_{d1} + d_2/v_{d2} + \ldots + d_i/v_{di}),$$

wherein $v_C$ is the sound velocity in the vessel wall section in the region of the oscillation element, $v_P$ is the sound velocity in the thickness direction in the oscillation element, and $d_1$ to $d_i$ are the thicknesses and $v_{d1}$ to $v_{di}$ are the sound velocities of further layers of the transducer array acoustically coupled in the thickness direction, if present, and the index number "i" is a natural number indicating the number of these further layers of the transducer array.

5. The device according to claim 1, wherein the transducer array includes a layer or a plurality of layers, the plurality of layers including coupling layers, characterized in that the thicknesses $d'_1$ to $d'_j$ of coupling layers, which are arranged to be acoustically coupled between the oscillation element and the vessel wall section in the thickness direction, and the minimum wall thickness $c_o$ of the vessel wall section are selected such that the condition $$c_o/v_c + \left((b^2/4 + r_P^2)^{1/2} - r_P\right)/(3v_C) + d'_1/v_{d'1} + d'_2/v_{d'2} + \ldots + d'_j/v_{d'j} = p/v_P \cdot (1/2 + q \pm \Delta q)$$

is satisfied, wherein $v_{d''1}$ to $v_{d''k}$ are the sound velocities of the coupling layers, wherein the index number j is a natural number indicating the number of coupling layers of the transducer array arranged between the oscillation element and the vessel wall section, if present, and q is a natural number, and the tolerance value $\Delta q$ is at least less than 0.3.

6. The device according to claim 1, wherein the thicknesses $d''_1$ to $d''_k$ of outer layers, acoustically coupled in the thickness direction, of the transducer array, which are arranged on the side of the oscillation element facing away from the vessel, are selected such that the condition $$d''_1/v_{d''1} + d''_2/v_{d''2} + \ldots + d''_k/v_{d''k} = p/v_P \cdot (s \pm \Delta s)$$

is satisfied, wherein $v_{d''1}$ to $v_{d''k}$ are the sound velocities of the outer layers, wherein the index number k is a natural number indicating the number of outer layers of the transducer array which are arranged on the side of the oscillation element facing away from the vessel, and s is a natural number, and the tolerance value $\Delta s$ is at least less than 0.3.

7. The device according to claim 1, wherein the vessel has, outside the region of the oscillation element and at least at the level of the oscillation element, a wall thickness c which satisfies the condition $c=v_C/2f \cdot (\frac{1}{2}+m\pm\Delta m)$, wherein m is a natural number, and the tolerance value $\Delta m$ is at least less than 0.3.

8. Method for producing a standing ultrasonic field with frequency f in a liquid, the method including the following steps:

exciting at least one oscillation element with at least one frequency f and the oscillation element forms a standing ultrasonic field within the vessel that causes the vessel and the liquid arranged in a circular-cylindrical interior to oscillate, and in response to the standing ultrasonic field, concentrating dispersed particles in the liquid or separating dispersed particles from the liquid, wherein the oscillation element has a mean thickness p and the interior has an inner radius $r_o$ and the oscillation element has a width b in an orthogonal direction to a main axis of the interior, wherein the width b is not greater than the inner diameter $2r_o$, characterized in in that the at least one oscillation element transmits the oscillations to the vessel via a substantially flat side wall via a substantially flat connection surface of the outside wall of the vessel in the region of the circular-cylindrical interior, and in that the connection surface is arranged parallel both to the main axis of the circular-cylindrical interior and to the oscillation element, wherein the width b of the oscillation element is in the range between $(r_P \cdot v_C \cdot f)^{1/2}$ and $4 \cdot (r_P \cdot v_C \cdot f)^{1/2}$, wherein $r_P=r_o+c_o$ applies, $r_o$ is the inner radius of the interior, $c_o$ is the minimum wall thickness of the vessel wall section in the region of the oscillation element and wherein $v_C$ is the sound velocity in the vessel wall section, wherein the frequency f is selected to lie outside the natural resonance frequencies $f_{er}$ of a transducer array including at least the oscillation element and a vessel wall section of the vessel in the region of the oscillation element, and in that the distance between the selected frequency f and the natural resonance frequencies $f_{er}$ is greater than one fifth of the distance $f_{er,1}-f_{er,2}$, wherein $f_{er,1}$ and $f_{er,2}$ are the two closest natural resonance frequencies $f_{er}$ with respect to the frequency f.

9. The method according to claim 8, wherein the frequency f is chosen such that the width b of the oscillation element is less than or equal to $3 \cdot (r_P \cdot v_C/f)^{1/2}$, wherein $r_P=r_o+c_o$ applies, $r_o$ is an inner radius of the interior, $c_o$ is a minimum wall thickness of a vessel wall section (10) in the region of the oscillation element, and $v_C$ is the sound velocity in the vessel wall section.

10. The method according to claim 8, wherein the frequency f is selected to lie outside the natural resonance frequencies $f_{er}$ of a transducer array including at least the oscillation element and a vessel wall section of the vessel in the region of the oscillation element, and in that the distance between the selected frequency f and the natural resonance frequencies $f_{er}$ is greater than one fifth of the distance $f_{er,1}-f_{er,2}$, wherein $f_{er,1}$ and $f_{er,2}$ are the two closest natural resonance frequencies $f_{er}$ with respect to the frequency f.

11. The method according to claim 8, further including the step of selecting the frequency f such that the half-wave number k of the transducer array satisfies the condition $$\kappa = 1/2 + n \pm \Delta n,$$

wherein n is a natural number and the tolerance value $\Delta n$ is at least less than 0.3, and the half-wave number $\kappa$ of a transducer array is substantially given by $$\kappa = 2f \cdot (c_{equ}/v_C + p/v_P + d_1/v_{d1} + d_2/v_{d2} + \ldots + d_i/v_{di}),$$

wherein the equivalent mean wall thickness $c_{equ}$ of a vessel wall section in the region of the oscillation element is defined by $c_{equ}=c_o+\Delta c/3$, wherein the difference $\Delta c$ between the maximum radial wall thickness cmax and the minimum wall thickness $c_o$ in the region of the center of the connection surface (11) is determined by the width b of the oscillation element via the relationship $\Delta c=(b^2/4+r_P^2)^{1/2}-r_P$, wherein $r_P=r_o+c_o$ applies, $v_C$ is the sound velocity in the vessel wall section in the region of the oscillation element, $v_P$ is the sound velocity in the thickness direction in the oscillation element and $d_1$ to $d_i$ are the thicknesses and $v_{d1}$ to $v_{di}$ are the sound velocities of further layers of the transducer array acoustically coupled in the thickness direction, if present, and the index number i is a natural number representing the number of said further layers of the transducer array, and in that the transducer array comprises at least the oscillation element and a vessel wall section in the region of the oscillation element.

12. The method according to claim 8, further including the step of selecting the frequency f such that a thickness p of the oscillation element corresponds approximately to $v_P/2f$ and $v_P$ is the sound velocity in the oscillation element.

13. The method according to claim 8, wherein at least one coupling layer is arranged between the oscillation element and a vessel wall section in the region of the oscillation element, wherein the minimum wall thickness $c_o$ of the vessel wall section and the thickness d' of the at least one coupling layer are such that the condition $$c_o/v_c + \left((b^2/4 + r_P^2)^{1/2} - r_P\right)/(3v_C) + d'_1/v_{d'1} + d'_2/v_{d'2} + \ldots + d'_j/v_{d'j} = p/v_P \cdot (1/2 + q \pm \Delta q)$$

is satisfied, wherein $v_{d'1}$ to $v_{d'j}$ are the sound velocities of the coupling layers, wherein q is a natural number, the index number j is a natural number indicating the number of coupling layers of the transducer array and the tolerance value $\Delta q$ is at least less than 0.3.

14. The method according to claim 8, wherein further layers of the transducer array include acoustically coupled outer layers arranged on the side of the oscillation element facing away from the vessel in the thickness direction, the thicknesses $d''_1$ to $d''_k$ of which are selected such that the condition $$d''_1/v_{d''1} + d''_2/v_{d''2} + \ldots + d''_k/v_{d''k} = p/v_P \cdot (s \pm \Delta s)$$

is satisfied, wherein $v_{d''_1}$ to $v_{d''_k}$ are the sound velocities of the outer layers, the index number k is a natural number indicating the number of the outer layers of the transducer array, and s is a natural number, and the tolerance value $\Delta s$ is at least less than 0.3.

15. The method according to claim 8, further including the step of choosing the frequency f such that the condition $c=v_C/2f \cdot (\frac{1}{2}+m\pm\Delta m)$ is satisfied, wherein m is a natural number, and the tolerance value $\Delta m$ is at least less than 0.3, and in that the wall thickness c is that of the vessel outside the range of the oscillation element.

16. The method according to claim 8, further including the steps of measuring, using a signal generator, at least the voltage amplitude, or current amplitude, or the phase relationship between current and voltage amplitude of the emitted signal, or a combination of these electrical quantities, via a control circuit, and fine-tuning the frequency f to a resonance frequency $f_{opt}$, determined from these measured quantities, of the device filled with the liquid.

\* \* \* \* \*